US012675610B2

(12) United States Patent
Tehranipoor et al.

(10) Patent No.: US 12,675,610 B2
(45) Date of Patent: Jul. 7, 2026

(54) FAULT-TO-TIME CONVERTER SENSOR FOR LOW-OVERHEAD FAULT INJECTION ATTACK MITIGATION

(71) Applicant: University of Florida Research Foundation, Incorporated, Gainesville, FL (US)

(72) Inventors: Mark Tehranipoor, Gainesville, FL (US); Farimah Farahmandi, Gainesville, FL (US); Kimia Zamiri Azar, Gainesville, FL (US); Md Rafid Muttaki, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 132 days.

(21) Appl. No.: 18/749,797

(22) Filed: Jun. 21, 2024

(65) Prior Publication Data

US 2024/0427943 A1     Dec. 26, 2024

Related U.S. Application Data

(60) Provisional application No. 63/509,710, filed on Jun. 22, 2023.

(51) Int. Cl.
| | |
|---|---|
| *G06F 21/75* | (2013.01) |
| *G06F 21/76* | (2013.01) |
| *H03L 7/091* | (2006.01) |

(52) U.S. Cl.
CPC .............. *G06F 21/75* (2013.01); *G06F 21/76* (2013.01); *H03L 7/091* (2013.01)

(58) Field of Classification Search
CPC .......... G06F 21/75; G06F 21/76; H03L 7/091
See application file for complete search history.

(56) References Cited

U.S. PATENT DOCUMENTS

| | | | | |
|---|---|---|---|---|
| 9,544,132 | B2 * | 1/2017 | Salgado ................. | G06F 21/55 |
| 10,289,840 | B2 * | 5/2019 | Elenes ................. | G06F 21/725 |
| 10,958,414 | B2 * | 3/2021 | Stark ................. | G06F 7/588 |
| 11,055,409 | B2 * | 7/2021 | Hershman ............... | G06F 21/71 |
| 11,070,876 | B2 * | 7/2021 | Rodgers ............. | H04L 63/1416 |
| 11,087,030 | B2 * | 8/2021 | Elenes ................. | G06F 21/75 |
| 12,197,584 | B2 * | 1/2025 | Liu ................. | G06F 21/575 |
| 12,265,613 | B2 * | 4/2025 | Ghetie ................. | G06F 21/75 |
| 2024/0005045 | A1 * | 1/2024 | Teglia ............. | G01R 31/31719 |
| 2024/0160545 | A1 * | 5/2024 | Srivastava ............. | G06F 12/14 |
| 2024/0393391 | A1 * | 11/2024 | Perez Chamorro ......................... G01R 31/31727 |

* cited by examiner

*Primary Examiner* — Viral S Lakhia
(74) *Attorney, Agent, or Firm* — Alston & Bird LLP

(57) ABSTRACT

Various embodiments of the present disclosure provide fault injection attack mitigation for an integrated circuit. In one example, an embodiment provides for providing a sampling clock signal to both high voltage threshold (HVT) cells and low voltage threshold (LVT) cells of a fault-to-time converter sensor of an integrated circuit, providing output of the HVT cells and the LVT cells to an encoder stage of the fault-to-time converter sensor, and detecting one or more fault injection attacks with respect to the integrated circuit based on output of the encoder stage.

17 Claims, 14 Drawing Sheets

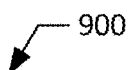
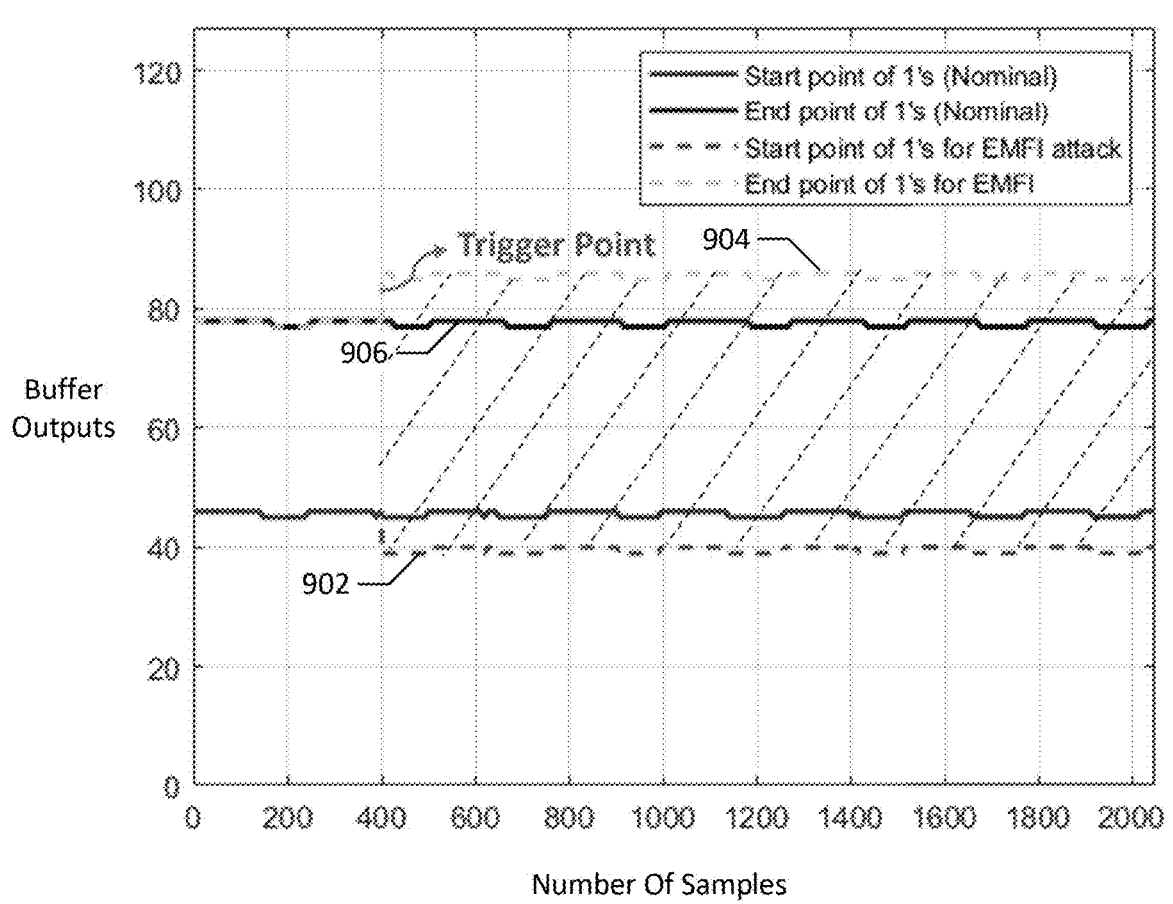
FIG. 9

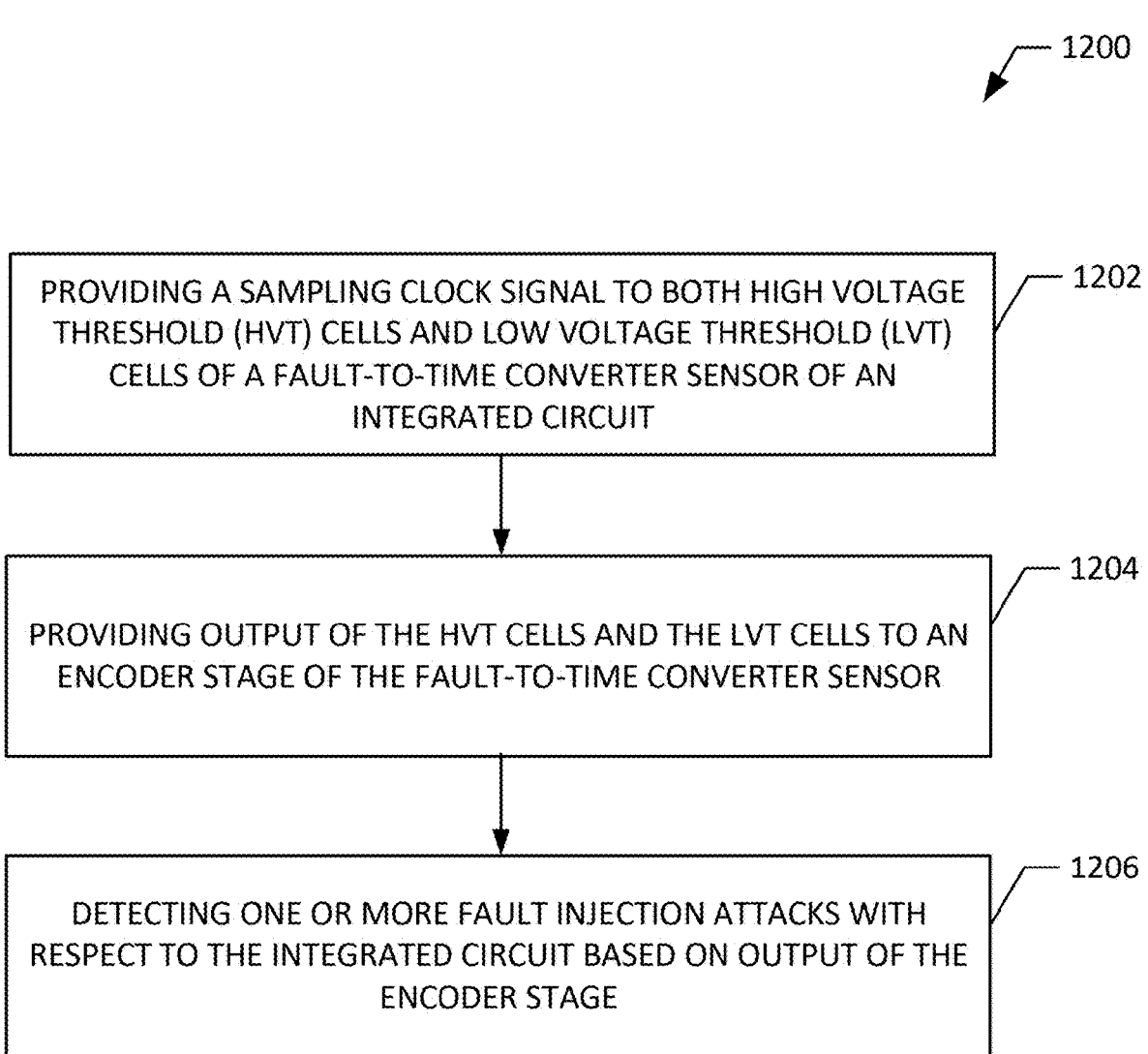

1200

PROVIDING A SAMPLING CLOCK SIGNAL TO BOTH HIGH VOLTAGE THRESHOLD (HVT) CELLS AND LOW VOLTAGE THRESHOLD (LVT) CELLS OF A FAULT-TO-TIME CONVERTER SENSOR OF AN INTEGRATED CIRCUIT — 1202

PROVIDING OUTPUT OF THE HVT CELLS AND THE LVT CELLS TO AN ENCODER STAGE OF THE FAULT-TO-TIME CONVERTER SENSOR — 1204

DETECTING ONE OR MORE FAULT INJECTION ATTACKS WITH RESPECT TO THE INTEGRATED CIRCUIT BASED ON OUTPUT OF THE ENCODER STAGE — 1206

FIG. 12

FAULT-TO-TIME CONVERTER SENSOR FOR LOW-OVERHEAD FAULT INJECTION ATTACK MITIGATION

CROSS REFERENCE TO RELATED APPLICATIONS

This application claims priority to U.S. Appl. No. 63/509,710 filed Jun. 22, 2023, the contents of which are incorporated herein in its entirety by reference.

TECHNICAL FIELD

The present application relates to the technical field of integrated circuits. In particular, the invention relates to fault injection attack mitigation for integrated circuits.

BACKGROUND

Internet of Thing (IoT) technology is becoming increasingly integrated into applications such as smart cities, connected autonomous vehicles, connected appliances, smart home security, autonomous vehicles, smart tracking of goods, and/or the like. However, with the emergence of IoT technology, security and privacy have emerged as major design challenges. Within connected computing and sensing components, or the "things" in an IoT system, notably the cryptographic hardware and field programmable gate arrays (FPGAs) in embedded systems, artificial intelligence (AI) accelerators, digital signal processors (DSPs), and microprocessors are all highly vulnerable to diverse forms of physical and non-physical attacks. These attacks can effectively bypass built-in security mechanisms in the design and put systems at risk. Among the attacks, fault-injection attacks have become a major concern to the computer security community, primarily due to their powerful capability in tampering with vulnerable locations in a device and ability for extracting secret.

SUMMARY

In general, embodiments of the present invention provide methods, apparatus, systems, computing devices, computing entities, and/or the like for providing a fault-to-time converter (FTC) sensor for low-overhead fault injection attack mitigation for integrated circuits. The details of some embodiments of the subject matter described in this specification are set forth in the accompanying drawings and the description below. Other features, aspects, and advantages of the subject matter will become apparent from the description, the drawings, and the claims.

In an embodiment, a method for providing fault injection attack mitigation for an integrated circuit is provided. The method provides for providing a sampling clock signal to both high voltage threshold (HVT) cells and low voltage threshold (LVT) cells of a fault-to-time converter sensor of an integrated circuit. The method additionally or alternatively provides for providing output of the HVT cells and the LVT cells to an encoder stage of the fault-to-time converter sensor. The method additionally or alternatively provides for detecting one or more fault injection attacks with respect to the integrated circuit based on output of the encoder stage.

In another embodiment, an apparatus is provided. The apparatus comprises at least one processor and at least one memory including program code. The at least one memory and the program code is configured to, with the at least one processor, cause the apparatus to provide a sampling clock signal to both HVT cells and LVT cells of a fault-to-time converter sensor of an integrated circuit, provide output of the HVT cells and the LVT cells to an encoder stage of the fault-to-time converter sensor, and/or detect one or more fault injection attacks with respect to the integrated circuit based on output of the encoder stage.

In yet another embodiment, a fault-to-time converter sensor is provided. The fault-to-time converter sensor includes a set of HVT cells, a set of LVT cells, an encoder device, and/or a processor. In one or more embodiments, the set of HVT cells are configured to receive a sampling clock signal. In one or more embodiments, the set of LVT cells are configured to receive the sampling clock signal. In one or more embodiments, the encoder device is configured to receive output from the set of HVT cells and the set of LVT cells. In one or more embodiments, the processor is configured to detect one or more fault injection attacks based on encoded output of the encoder device.

BRIEF DESCRIPTION OF THE DRAWINGS

Reference will now be made to the accompanying drawings, which are not necessarily drawn to scale, and wherein:

FIG. 9 illustrates an example graph related to sensor outputs for detecting a fault injection attack, according to one or more embodiments of the present disclosure;

FIG. 12 illustrates a flowchart of a method for providing fault injection attack mitigation for an intigrated circuit, according to one or more embodiments of the present disclosure.

DETAILED DESCRIPTION

Figure 1:
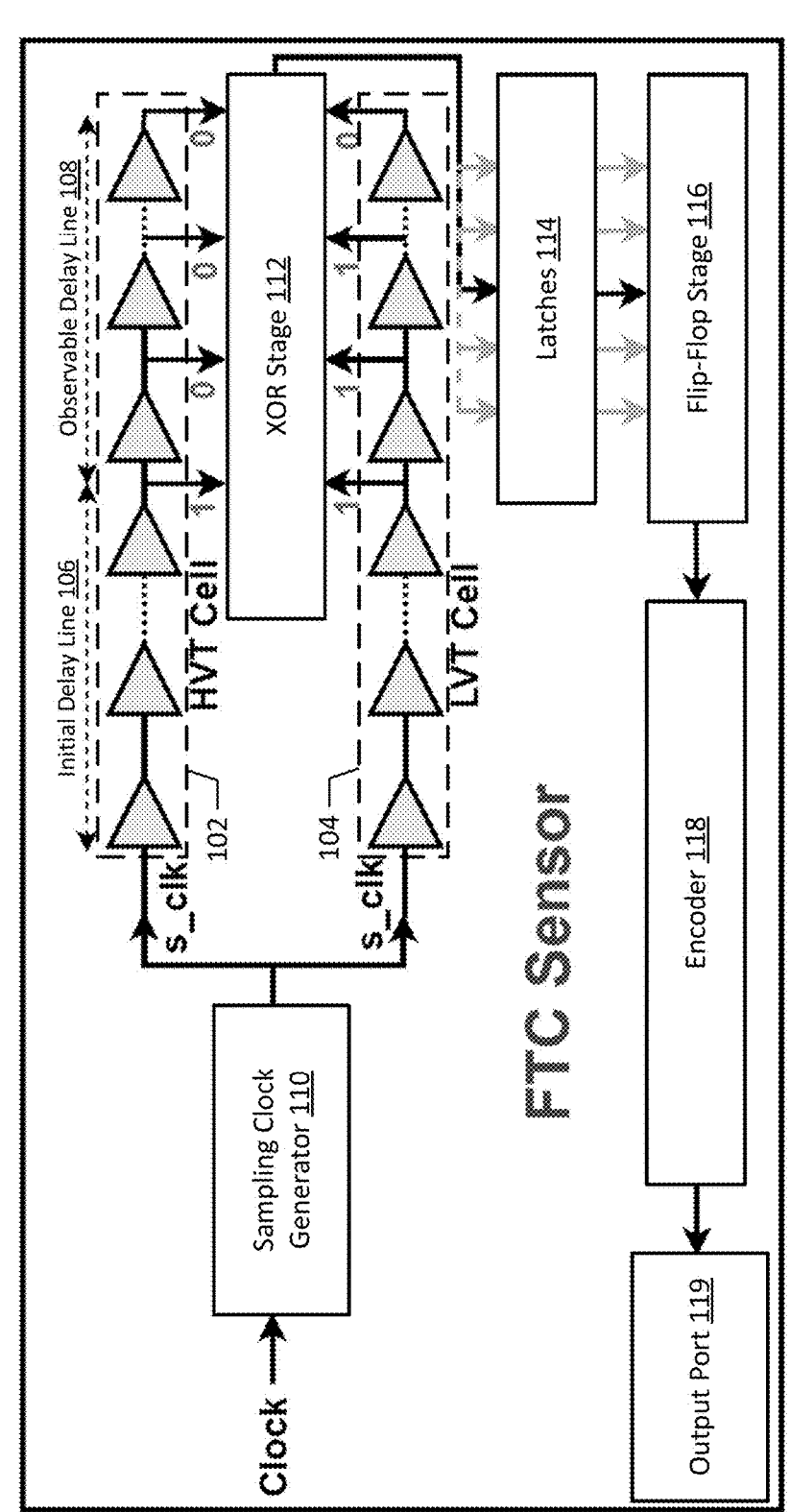
FIG. 1 provides an example fault-to-time converter sensor, according to one or more embodiments of the present disclosure.

The present disclosure more fully describes various embodiments with reference to the accompanying drawings. It should be understood that some, but not all, embodiments are shown and described herein. Indeed, the embodiments may take many different forms, and, accordingly, this disclosure should not be construed as limited to the embodiments set forth herein. Rather, these embodiments are provided so that this disclosure will satisfy applicable legal requirements. Like numbers refer to like elements throughout.

As discussed above, Internet of Thing (IoT) technology is becoming increasingly integrated into applications such as smart cities, connected autonomous vehicles, connected appliances, smart home security, autonomous vehicles, smart tracking of goods, and/or the like. However, with the emergence of IoT technology, security and privacy have emerged as major design challenges. Within connected computing and sensing components, or the "things" in an IoT system, notably the cryptographic hardware and field programmable gate arrays (FPGAs) in embedded systems, artificial intelligence (AI) accelerators, digital signal processors (DSPs), and microprocessors are all highly vulnerable to diverse forms of physical and non-physical attacks. These attacks can effectively bypass built-in security mechanisms in the design and put systems at risk. Among the attacks, fault-injection attacks have become a major concern to the computer security community, primarily due to their powerful capability in tampering with vulnerable locations in a device and ability for extracting secret.

In recent times, fault injection attacks (FIAs) have emerged as one of the most serious hardware attacks for systems such as IoT systems. FIAs are typically executed to access secret information, violating data integrity, or causing a denial of service. For example, in a fault-injection attack, the faults are intentionally injected in a system to compromise the security by causing the denial of service (DOS), achieving illegal authentication, or facilitating leakage of secrets in the system. Fault-injection attacks can be non-invasive (e.g., clock glitching or voltage glitching), semi-invasive (e.g., local heating or laser), or invasive (e.g., focused ion beam), which can be carried out by a variety of techniques and instruments with different cost and precision. Different forms of fault-injection attacks have been successfully demonstrated by researchers in academia as well as practitioners in the industry on many security-critical applications. This includes advanced encryption standard (AES), data encryption standard (DES), and RSA encryption algorithms, error correction code (ECC), radio-frequency identification (RFID), virtual machines, microcontrollers, as well as analog sensors. Almost all platforms, such as smart cards, system-on-chips (SoCs), FPGA-based embedded systems, and IoT devices, are vulnerable to fault-injection attacks, which corroborates the criticality of this attack vector. Some types of fault-injection techniques are briefly discussed below:

1) Clock Glitching: One very low-cost and non-invasive technique to inject faults is to tamper with the clock signal to cause either setup or hold time violations. For example, the length of a clock cycle can be shortened by driving a premature toggling of the clock signal. With clock glitching, a clock signal may have been faulted with a shortened clock cycle. For example, a first illustrated clock cycle of the clock signal may span a time period $T_{CLK}$. However, a second clock cycle may be prematurely toggled to span the time period $T_g$. For example, the time period $T_g$ spanned by the second clock cycle that is prematurely toggled may be significantly shorter than the time period $T_{CLK}$, which the second clock cycle is expected to span. Generally, a clock signal can be glitched to cause a clock cycle to have a significantly shorter length or a significantly longer length. In normal operation, the clock cycle ($T_{CLK}$) should be longer than the maximum path delay (T) of combinational logic. However, when a clock glitch occurs, $T_g$ is less than $\tau$, so a subsequent or second register may capture the wrong (e.g., premature) data from the combinational logic, in which a fault is injected and will propagate in the circuit. Such a glitch in a processor can result in skipping an instruction or storing incorrect data in the memory modules. In addition, a clock glitch may cause the wrong data to be latched in flip-flops or registers. For example, if one bit of the key is not latched correctly by the key register in a crypto engine, this key bit can be deduced by comparing the faulty and the correct output of the crypto engine. Such faults are transient so that they can be injected without any footprint of tampering.

2) Voltage Glitching: Another low-cost technique is tampering with the power supply of a device. For example, one can run the chip with a depleted power supply so that some high threshold voltage transistors would never be open, thus transient faults are injected in the device. Another method is to leverage power spikes so that the setup time requirement of flip-flops may be violated similar to clock glitching, which can cause a processor to skip an instruction or a crypto engine to skip a round of encryption/decryption. This fault-injection technique is commonly utilized to tamper with a program counter, or a loop bound. Usually, voltage and clock glitching are used together to increase the possibility of setup time violation of flip-flops.

3) Electromagnetic (EM) Manipulation: An external electromagnetic field can also be exploited to inject faults. It can cause malfunctioning of a chip or flip memory cell(s). Eddy currents on the chip surface can be induced by the EM field, which can cause a single-bit fault. For example, a gas-lighter can be used to inject EM faults at a very low cost. The single-bit fault injected by EM can be used to facilitate the propagation of secret data, e.g., keys, to observable nodes.

4) Light and Laser: A strong and precisely focused light beam or laser can be exploited to induce alterations in one or more logic gates. For example, a laser can create electron-hole pairs at the drain of a NMOS and thus create a current pulse. The current pulse will create a voltage pulse that can be further propagated in the circuit. For example, by targeting one transistor in static random-access memory (SRAM) cell, the cell can be flipped up or down at will. Hence, it is possible for attackers to flip one of the key bits loaded in the cache and deduce the value of that key bit by comparing the output of a crypto process. However, the spot size of the light is physically limited by the wavelength of the photons. It is no longer possible to hit a single SRAM cell using the current optical technologies since the width of the gate dielectric in the advanced technology nodes is now an order of magnitude smaller than the shortest wavelength of visible light. However, it does not necessarily imply the inability to inject a single-bit fault. Injecting a single-bit fault in a reproducible way has been demonstrated, despite the fact that the optical precision of the equipment was not able to target the smallest features of the chip.

5) Focused Ion Beam (FIB): The most accurate fault-injection technique uses a focused ion beam, which is a powerful instrument commonly used in the development, manufacturing, and reworking (editing) of semiconductor devices and integrated circuits (ICs). FIBs use ions at the low beam and high beam currents for imaging surface topology and site-specific milling/deposition, respectively. These capabilities allow designers to cut or add traces to the substrate within a chip, thereby enabling them to redirect signals, modify trace paths, and add/remove circuits. An attacker can use FIB to build a conducting path from chip surface to the internal net so that signals carried on the net can be extracted through this path (probing attack) and transient faults can be injected through this path as well (fault-injection attack).

With certain types of FIAs such as voltage glitch and EMFI which can impact a power line of a device, delay variation can be created through the interconnects. Other types of FIAs such as clock glitch can disrupt the original clock signal and/or corrupt the data by setup/hold violations. Additionally, with other types of types of FIAs such as optical and laser fault injection, systems can be impacted in a localized manner by changing the transistor states. This change can also cause current flow variation through the transistors and/or can induce voltage variation.

Accordingly, to ensure a security of a system such as an IoT system, it is desirable to detect FIAs as soon as possible after the FIAs are launched. However, the stealthy and transient nature of FIAs typically makes it very difficult to detect FIAs in real-time.

Countermeasures evolve over time with the sophistication of fault-injection attacks. Since any countermeasure comes at a cost, in practice, they are selected with a good balance between overhead and security. In fact, many countermeasures are developed to make an attack sufficiently expensive for the attacker but not impossible. There are two major categories of countermeasures to protect a design against fault-injection attacks: intrusion detection and error detection:

1) Intrusion Detection: Countermeasures in this category are developed to detect any attempted tampering with the device and make the device physically inaccessible. They are developed to prevent a specific fault-injection technique. One notable example is using shields (passive or active), in which wire mesh is used to cover a part of or the entire chip to detect an optical fault or probing attacks. In addition, analog sensors can be applied in the chip to detect different fault-injection attacks. For example, light sensors and frequency detectors are used to detect optical fault-injection and clock glitching, respectively. The main drawback of the intrusion detection-based countermeasures is their high cost with large overhead and design efforts.

2) Error Detection: This approach modifies the design to allow the detection of injected faults at the algorithm level. One common method is concurrent error detection (CED), which can check the correctness of the algorithm by introducing redundancy. Typically, there are three types of redundancy in terms of resources: hardware, time, and information. As an example, hardware redundancy indicates adding extra hardware into the device to either detect or correct the impacts of the faults injected. The most common example is the triple modular redundant (TMR) structure which has three identical modules whose outputs are voted for correct functionality. Time redundancy can also be utilized to detect faults by re-running the same process on the same hardware. However, these approaches introduce at least 3×/2× area/performance overhead, respectively, which is too high to be practical for large-scale complex designs. As another example, information redundancy is based on error detection codes (EDCs) or error correction codes (ECCs), which may require a smaller overhead. The main drawback of the EDC/ECC based countermeasures, however, is possible lower fault coverage because not every combination of errors can be detected. For example, parity-based EDCs are capable of detecting any fault that consists of an odd number of bit errors; however, an even number of bit errors occurring in a single byte will not be detected.

Moreover, typical countermeasures focus on individual attack types. For example, a sense amplifier and RC-circuit-based detection techniques may be utilized for voltage glitch detection, frequency detectors and clock monitors may be utilized for clock glitch detection, LC-oscillator and Phase-Locked-Loop (PLL)-based on-chip sensors may be utilized for EMFI detection, and/or the like. For detecting optical/laser fault injection attacks, frequency ripple monitors and sensors based on buffers on the circuit's reset signal tree may also be utilized. For developing a comprehensive solution against these FIAs, certain fault-injection countermeasures apply the individual countermeasure techniques in conjunction. However, the area and power overheads incurred for implementing multiple countermeasure mechanisms on the same device is typically very high. Additionally, the probability of potential physical interactions among the individual techniques affecting detection capabilities may also occur. As a result, it is desirable to provide a universal lightweight solution against FIAs.

To address these and/or other issues, various embodiments described herein relate to a fault-to-time converter (FTC) sensor for low-overhead fault injection attack mitigation for integrated circuits. Various embodiments of the present disclosure enable more efficient fault injection attack countermeasures to be provided to reduce the overall protection overhead on area, power, and/or performance while ensuring security of integrated circuits. The FTC sensor can provide a universal detection mechanism against FIAs. For example, the FTC sensor can be configured to effectively detect multiple FIAs including, but not limited to, clock glitching, voltage glitching, EM manipulation (e.g., EM fault injection), light and laser (e.g., optical/laser fault injection), and/or FIB. The FTC sensor can also be configured to effectively detect multiple FIAs while utilizing minimal overhead with respect to cost and/or computing resources for an integrated circuit. The FTC sensor can also efficiently detect multiple FIAs at a high accuracy as compared to traditional FIA countermeasures.

In various embodiments, the FTC sensor can be configured as a delay line-based FTC sensor that converts a physical consequence of injected faults to a measurable time scale to detect deviations from nominal reading of the delay-line under attack conditions. For example, the FTC sensor can convert the effects of faults injected by an FIA technique into "time" that is measurable. The "time" difference can be further analyzed to identify whether an FIA has been carried out successfully. The sensor design of the FTC sensor can be implemented via an FPGA platform, an application-specific integrated circuit (ASIC) platform, an SoC platform, or another type of hardware platform. In various embodiments, the FTC sensor can effectively differentiate various FIA attack scenarios based on encoded output. The FTC sensor can also be configured to mitigate other fault attacks that have a similar impact on a device (e.g., affecting circuit timing, and/or the like).

A. Exemplary Fault-to-Time Converter (FTC) Sensor

An example FTC sensor 100 for low-overhead fault injection attack mitigation for integrated circuits is shown in FIG. 1, according to one or more embodiments of the present disclosure. As discussed above, fault injection attacks can impact internal timing of a device and/or integrated circuit. To mitigate these and/or other issues related to fault injection attacks, the FTC sensor 100 is configured to repeatedly (e.g., constantly) monitor delay variations to reveal underlying fault injection attacks. Accordingly, the FTC sensor 100 can be configured as a delay line-based FTC sensor for fault injection attack detection in order to detect not only voltage fluctuations, but also clock glitching and/or one or more other fault injection attacks. In various embodiments, the FTC sensor 100 can be positioned proximate to one or more critical locations (e.g., one or more locations for a potential fault injection attack) of an integrated circuit to monitor potential security breaches with respect to the integrated circuit. In various embodiments, the FTC sensor 100 is configured as a dual delay-line based sensor that includes high voltage threshold (HVT) cells 102 and low voltage threshold (LVT) cells 104. The HVT cells 102 can be HVT buffer cells and the LVT cells 104 can be LVT buffer cells. In various embodiments, the HVT cells 102 and/or the LVT cells 104 can be configured using transparent lookup tables.

As illustrated in FIG. 1, the FTC sensor 100 can include two delay lines (e.g., initial delay line 106 and observable delay line 108) that consists of the HVT cells 102 and the LVT cells 104 to magnify impact of incurred delay due to the fault injection attacks. In various embodiments, the HVT cells 102 and the LVT cells 104 can be configured to monitor transient changes with respect to a sampling clock (e.g., sampling clock signal s_slk illustrated in FIG. 1). In various embodiments, the sampling clock can be generated via a sampling clock generator 110. For example, the sampling clock generator 110 can convert a clock (e.g., Clock illustrated in FIG. 1) into the sampling clock. In various embodiments, the sampling clock generate can scale the clock to a defined frequency to provide the sampling clock. The clock can be a driver clock or another type of external clock signal for an integrated circuit. Additionally, the sampling clock can be provided to both the HVT cells 102 and the LVT cells 104.

In various embodiments, the HVT cells 102 can be configured as an HVT delay-line that is highly sensitive to delay increase due to under voltage attacks. Additionally, in various embodiments, the LVT cells 104 can be configured as an LVT delay-line that is highly sensitive to delay decrease caused by over voltage attacks. As such, the FTC sensor 100 can be capable of efficiently detecting both under-voltage and over-voltage attacks. In various embodiments, by utilizing the HVT cells 102 and the LVT cells 104, the FTC sensor 100 can be executed at a speed that corresponds to a driver clock for an integrated circuit. Additionally, the FTC sensor 100 can be highly efficient in detecting short delay anomalies related to fault injection attacks, as compared to traditional fault injection attack countermeasures.

In various embodiments, the FTC sensor 100 includes XOR stage 112 that analyzes results (e.g., XORs results) from the HVT cells 102 and the LVT cells 104 to provide increased output sensitivity for the FTC sensor 100. For example, the FTC sensor 100 can be capable of generating outputs sensitive to a set of fault injection attacks. In various embodiments, the sensitivity of the sensor can be adjusted by calibrating initial and/or observable delay length associated with the HVT cells 102 and/or the LVT cells 104.

In various embodiments, the sampling clock can drive the HVT cells 102 and the LVT cells 104 to sense timing delay variations and/or to detect fault injection attacks. The utilization of the HVT cells 102 and the LVT cells 104 by the FTC sensor 100 can allows an effective range of the FTC sensor 100 to be increased to accurately detect more than one fault injection attack. For example, the HVT cells 102 and the LVT cells 104 can be more sensitive to voltage and delay variations as compared to traditional fault injection attack countermeasures.

In various embodiments, after being processed by the HVT cells 102 and the LVT cells 104, the sampling clock can be provided to a set of latches 114. For example, after being processed by the HVT cells 102 and the LVT cells 104, the sampling clock can be provided to a respective clock port (e.g., a clock enable port) of the set of latches 114.

In this case, the delay lines of the FTC sensor 100 can capture XORed values of each HVT cell and LVT cell of the HVT cells 102 and the LVT cells 104. In various embodiments, the set of latches 114 can store patterns from the observable delay line when respective enable ports are de-asserted. In various embodiments, the cached readings associated with the set of latches 114 can be loaded by a flip-flop stage 116. The flip-flop stage 116 can include a set of flip-flop devices. Due to the uneven routing paths restricted by hardware wire resources, the reading may exhibit intermittent bit value (e.g., intermittent 1's and 0's). As such, in various embodiments, the FTC sensor 100 includes an encoder 118. The encoder 118 can be, in certain embodiments, a bubble-proof encoder configured to exclude unexpected '0' bit values (e.g., bubbles) and translate the readings into decimal values. The output of the XOR stage 112 in a properly calibrated sensor will be an array of '1' bit values surrounded by '0' bit values on either side. Accordingly, in various embodiments, the length of the observable buffer and the initial buffer delay lines can be adjusted to calibrate the FTC sensor 100. To properly represent this in decimal form, the encoder 118 can provide two outputs (e.g., the bit locations of the least and most significant '1' bit values from the flip-flop stage 116). In various embodiments, the outputs of the encoder 118 can be output via an outport port 119.

In various embodiments, the clock (e.g., Clock illustrated in FIG. 1) is an external clock signal. In certain embodiments, the clock (e.g., Clock illustrated in FIG. 1) can be a clock associated with an integrated circuit. In various embodiments, the clock can be adjusted to a desired frequency by performing scaling with respect to the clock via the sampling clock generator 110. For example, the clock can be scaled via the sampling clock generator 110 to generate the sampling clock (e.g., sampling clock signal s_slk illustrated in FIG. 1). The sampling clock can be a scaled signal that drives one or more portions (e.g., the HVT cells 102 and the LVT cells 104) of the FTC sensor 100. The sampling clock can be additionally utilized to detect timing delay variations caused by fault injection attacks. In various embodiments, the sampling clock can be split into two paths within the FTC sensor 100 to drive the HVT cells 102 and the LVT cells 104. In various embodiments, the HVT cells 102 and the LVT cells 104 can be implemented within buffer lines (e.g., buffer delay lines) to enhance sensitivity to voltage and/or timing variations associated with a fault injection attack. For example, a first portion of the HVT cells 102 can be implemented as an initial delay line 106 and a second portion of the HVT cells 102 can be implemented as an observable delay line 108. Additionally, a first portion of the LVT cells 104 can be implemented as an initial delay line 106 and a second portion of the LVT cells 104 can be implemented as an observable delay line 108. The initial delay line 106 and the observable delay line 108 can capture XOR outputs from each HVT cell of the HVT cells 102 and/or each LVT of the LVT cells 104.

In various embodiments, the XOR outputs captured from each HVT cell of the HVT cells 102 and/or each LVT of the LVT cells 104 can be stored via one or more latches of the set of latches 114. Additionally, the flip-flop stage 116 can load the cached readings (e.g., XOR outputs) stored in the set of latches 114. In various embodiments, the encoder 118 can filter out unexpected XOR output values (e.g., unexpected 0s). Additionally or alternatively, the encoder 118 can identify a particular sequence of expected XOR output values. For example, the encoder 118 can identify a longest sequence of Is. For example, the encoder 118 can detect a start and end of a particular sequence of expected XOR output values (e.g., a longest sequence of 1s), average values of the particular sequence to determine baseline data, and/or adjust the particular sequence based on a certain degree of weighting to account for device and environmental differences with a threshold. As such, deviations from the threshold can correspond to a fault injection attack condition. In certain embodiments, the encoder 118 can be a bubble-proof encoder configured to identify one or more bubble errors associated with the XOR output values stored in the set of latches 114. For example, a bubble error can correspond to a missing logic state associated with an expected value for an XOR output value stored in the set of latches 114. As such, in various embodiments, the FTC sensor 100 can provide sensor range fine-tuning that adjust initial and observable buffer lengths to ensure consistent XOR output and/or to identify a longest sequence of logic states (e.g., 1s) while modifying initial buffer lengths and maintaining a constant observable buffer length.

In various embodiments, the FTC sensor 100 can be adaptable for an ASIC platform and/or an FPGA platform. In various embodiments, the FTC sensor 100 can utilize a technology library containing different threshold voltage buffer cells. For example, behavior of the threshold voltage buffer cells can be configured using transparent lookup tables (LUTs) to create variable delays that emulate LVT cells and/or HVT cells with different LUT configurations (e.g., 1-LUT for LVT, 2-LUTs for HVT).

Figure 2:
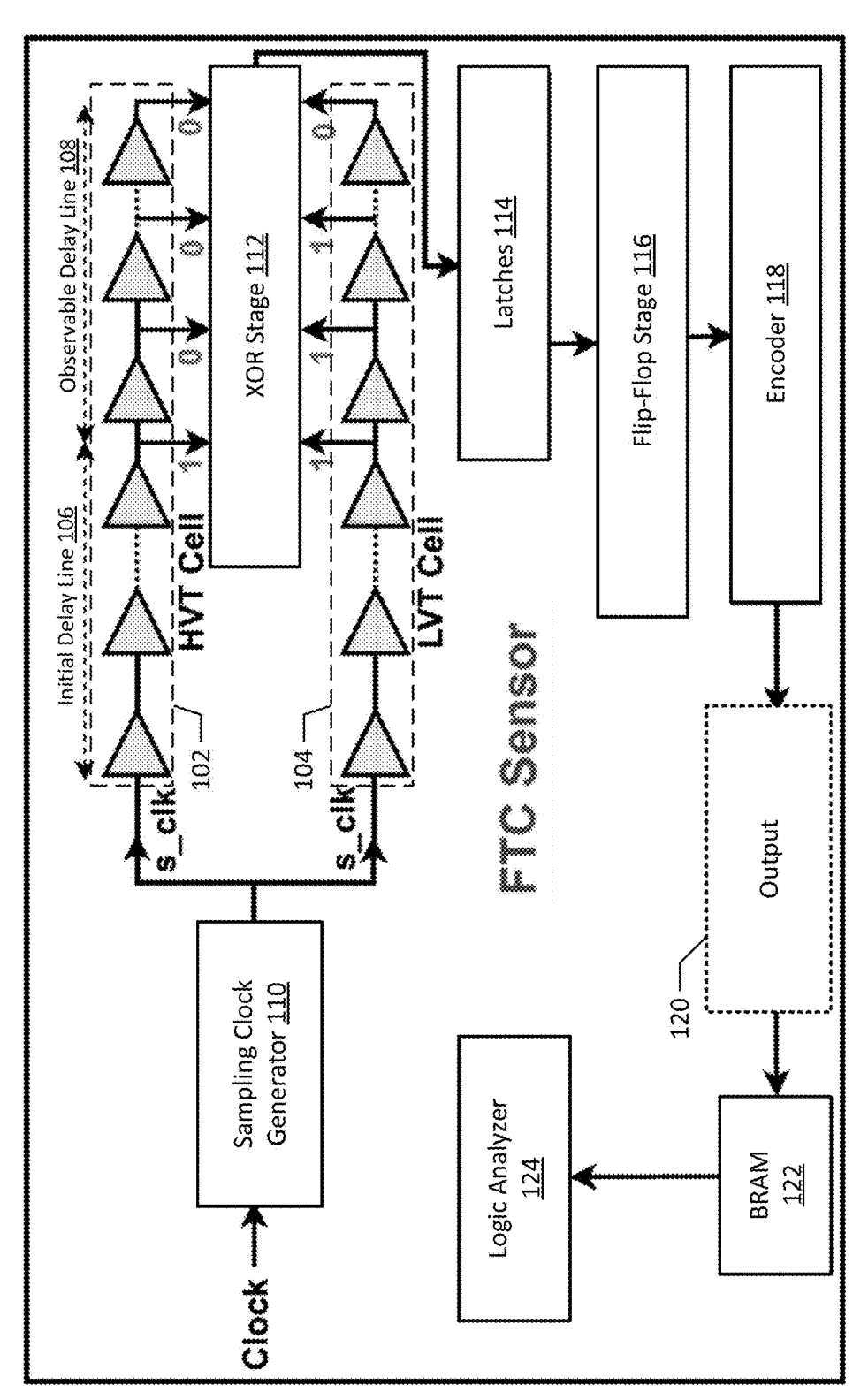
FIG. 2 provides another example fault-to-time converter sensor, according to one or more embodiments of the present disclosure.

An example FTC sensor 100' for low-overhead fault injection attack mitigation for integrated circuits is shown in FIG. 2, according to one or more embodiments of the present disclosure. The FTC sensor 100' can be, for example, an alternate embodiment of the FTC sensor 100. As discussed above, fault injection attacks can impact internal timing of a device and/or integrated circuit. To mitigate these and/or other issues related to fault injection attacks, the FTC sensor 100' is configured to repeatedly (e.g., constantly) monitor delay variations to reveal underlying fault injection attacks. Accordingly, the FTC sensor 100' can be configured as a delay line-based FTC sensor for fault injection attack detection in order to detect not only voltage fluctuations, but also clock glitching and/or one or more other fault injection attacks. In various embodiments, the FTC sensor 100' can be positioned proximate to one or more critical locations (e.g., one or more locations for a potential fault injection attack) of an integrated circuit to monitor potential security breaches with respect to the integrated circuit. In various embodiments, the FTC sensor 100' is configured as a dual delay-line based sensor that includes the HVT cells 102 and the LVT cells 104.

As illustrated in FIG. 2, the FTC sensor 100' can include two delay lines (e.g., initial delay line 106 and observable delay line 108) that consists of the HVT cells 102 and the LVT cells 104 to magnify impact of incurred delay due to the fault injection attacks. In various embodiments, the HVT cells 102 and the LVT cells 104 can be configured to monitor transient changes with respect to a sampling clock (e.g., sampling clock signal s_slk illustrated in FIG. 2). In various embodiments, the sampling clock can be generated via the sampling clock generator 110. For example, the sampling clock generator 110 can convert a clock (e.g., Clock illustrated in FIG. 2) into the sampling clock. In various embodiments, the sampling clock generate can scale the clock to a defined frequency to provide the sampling clock. The clock can be a driver clock or another type of external clock signal for an integrated circuit. Additionally, the sampling clock can be provided to both the HVT cells 102 and the LVT cells 104.

In various embodiments, the FTC sensor 100' includes the XOR stage 112 that analyzes results (e.g., XORs results) from the HVT cells 102 and the LVT cells 104 to provide increased output sensitivity for the FTC sensor 100'. For example, the FTC sensor 100' can be capable of generating outputs sensitive to a set of fault injection attacks. In various embodiments, the sensitivity of the sensor can be adjusted by calibrating initial and/or observable delay length associated with the HVT cells 102 and/or the LVT cells 104.

In various embodiments, the sampling clock can drive the HVT cells 102 and the LVT cells 104 to sense timing delay variations and/or to detect fault injection attacks. The utilization of the HVT cells 102 and the LVT cells 104 by the FTC sensor 100' can allows an effective range of the FTC sensor 100' to be increased to accurately detect more than one fault injection attack. For example, the HVT cells 102 and the LVT cells 104 can be more sensitive to voltage and delay variations as compared to traditional fault injection attack countermeasures.

In various embodiments, after being processed by the HVT cells 102 and the LVT cells 104, the sampling clock can be provided to the set of latches 114. For example, after being processed by the HVT cells 102 and the LVT cells 104, the sampling clock can be provided to a respective clock port (e.g., a clock enable port) of the set of latches 114.

In this case, the delay lines of the FTC sensor 100' can capture XORed values of each HVT cell and LVT cell of the HVT cells 102 and the LVT cells 104. In various embodiments, the set of latches 114 can store patterns from the observable delay line when respective enable ports are de-asserted. In various embodiments, the cached readings associated with the set of latches 114 can be loaded by a flip-flop stage 116. The flip-flop stage 116 can include a set of flip-flop devices. Due to the uneven routing paths restricted by hardware wire resources, the reading may exhibit intermittent bit value (e.g., intermittent 1's and 0's). As such, in various embodiments, the FTC sensor 100' includes the encoder 118. The encoder 118 can be, for example, a bubble-proof encoder configured to exclude unexpected '0' bit values (e.g., bubbles) and translate the readings into decimal values. In various embodiments, the encoder 118 can provide an output 120 that can be utilized to detect of one or more fault injection attacks based on cached readings (e.g., output of the HVT cells 102 and/or the LVT cells 104) associated with the set of latches 114 and/or loaded by the flip-flop stage 116. For example, the output 120 can be utilized to provide a prediction as to whether an integrated circuit is associated with one or more fault injection attacks.

The output of the XOR stage 112 in a properly calibrated sensor will be an array of '1' bit values surrounded by '0' bit values on either side. Accordingly, in various embodiments, the length of the observable buffer and the initial buffer delay lines can be adjusted to calibrate the FTC sensor 100'. To properly represent this in decimal form, the encoder 118 can provide output 120 associated with the length of the observable buffer and/or the initial buffer delay lines. In some embodiments, the output 120 can include a particular sequence of expected XOR output values associated with the HVT cells 102 and/or the LVT cells 104. For example, the output 120 can identify a longest sequence of Is. In some embodiments, the output 120 can include two outputs (e.g., the bit locations of the least and most significant '1' bit values from the flip-flop stage 116). In various embodiments, the output 120 of the encoder 118 can be stored in memory such as, for example, a block random access memory (BRAM) 122. In various embodiments, the FTC sensor 100 includes a logic analyzer 124 to analyze the output 120 stored in the BRAM 122 in order to detect one or more fault injection attacks.

Figure 3:
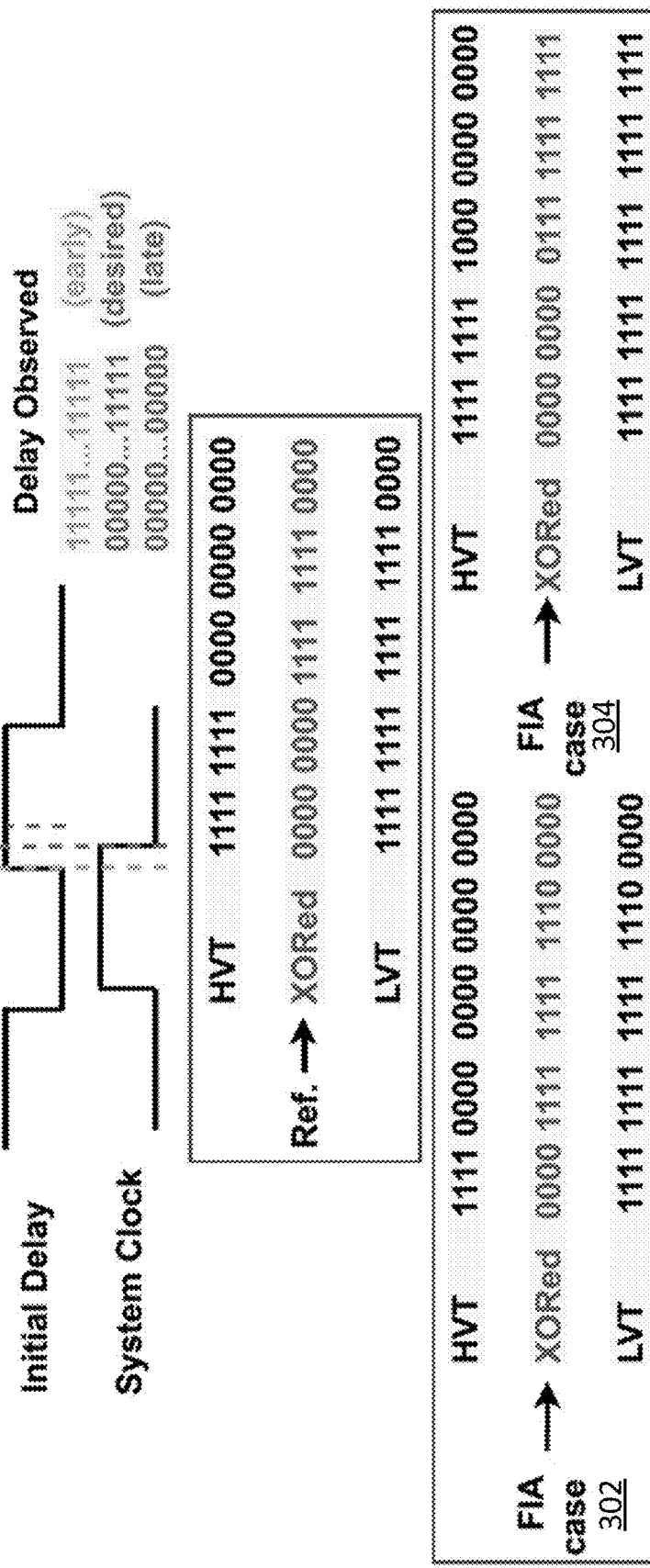
FIG. 3 illustrates example fault injection attack scenarios according to one or more embodiments of the present disclosure.

FIG. 3 illustrates example fault injection attack scenarios, according to one or more embodiments of the present disclosure. For example, FIG. 3 can illustrate how dual delay line may generate high-resolution outputs. In an example, a length of the observable delay line 108 for the HVT cells 102 and the LVT cells 104 can be 20. In nominal condition, the buffer values and the XORed latched output (e.g., eight '1' bit values) can be marked as Ref. as illustrated in FIG. 3. For this scenario, encoded output can correspond to the location of the start and end position of '1' bit values from the flip-flop stage 116. In an example, a delay increase by a fault injection attack due can be due to a voltage undershoot. In this case (e.g., FIA case 302 illustrated in FIG. 3), the HVT cells 102 can be impacted due to the higher voltage threshold requirement of the HVT cells 102. Accordingly, a higher number of '0' bit values can be introduced in the HVT cells 102 as compared to the LVT cells 104. Here, the total number of '1' values introduced at the output of the XOR stage 112 can be 11. In another example, delay decrease can be due to voltage overshoot by a fault injection attack. In this case (e.g., FIA case 304 illustrated in FIG. 3), the LVT cells 104 can pass more '1' values than the HVT cells 102 due to the lower voltage threshold requirement of the LVT cells 104. Similarly, the number of '1' bit values introduced at the output of the XOR stage 112 can be 11. As such, when the XORed outputs are compared to the nominal case, a 3-bit change is provided. Accordingly, the FTC sensor 100 and/or the FTC sensor 100' can provide improved detectable resolution change as compared to traditional fault injection attack countermeasures.

In various embodiments, the FTC sensor 100 and/or the FTC sensor 100' can be provided without a technology library. Additionally, the FTC sensor 100 and/or the FTC sensor 100' can be implemented in conjunction with different designs in ASIC platforms, FPGA platform, SoC platforms, or other hardware platforms.

Figure 4A:
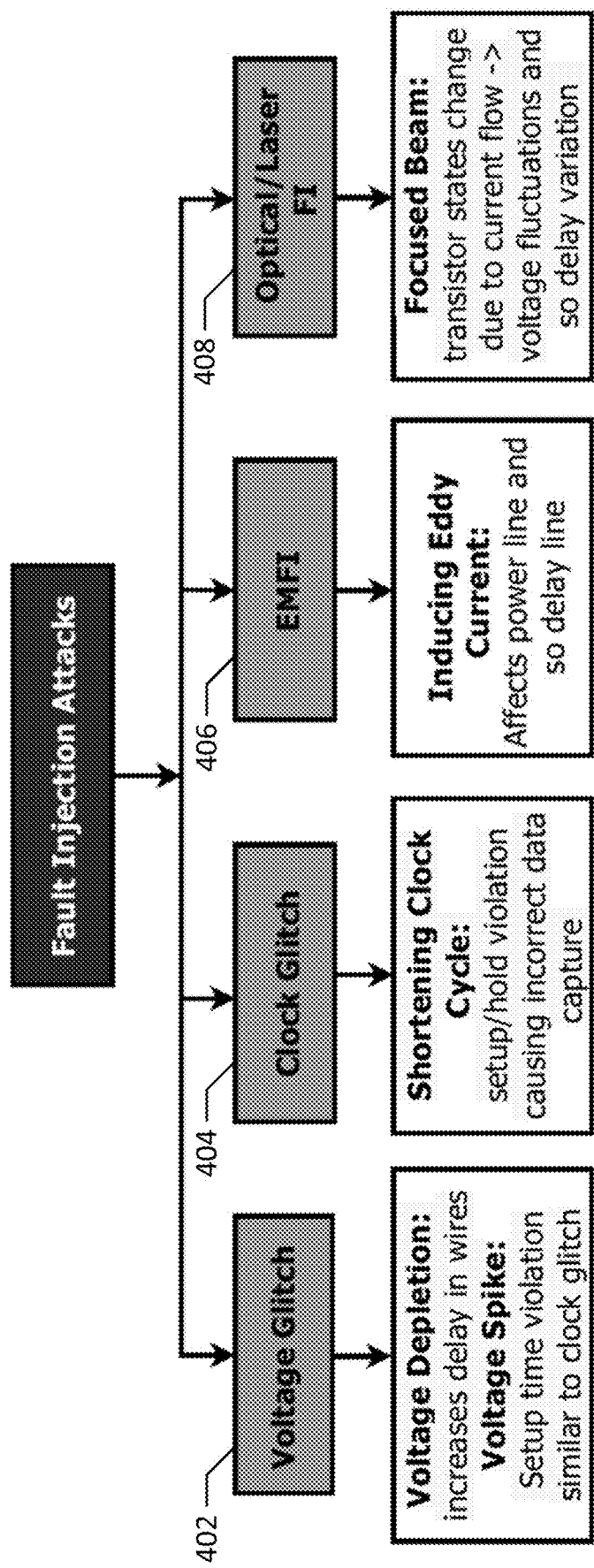
FIG. 4A illustrates example fault injection attacks, according to one or more embodiments of the present disclosure.
Figure 4B:
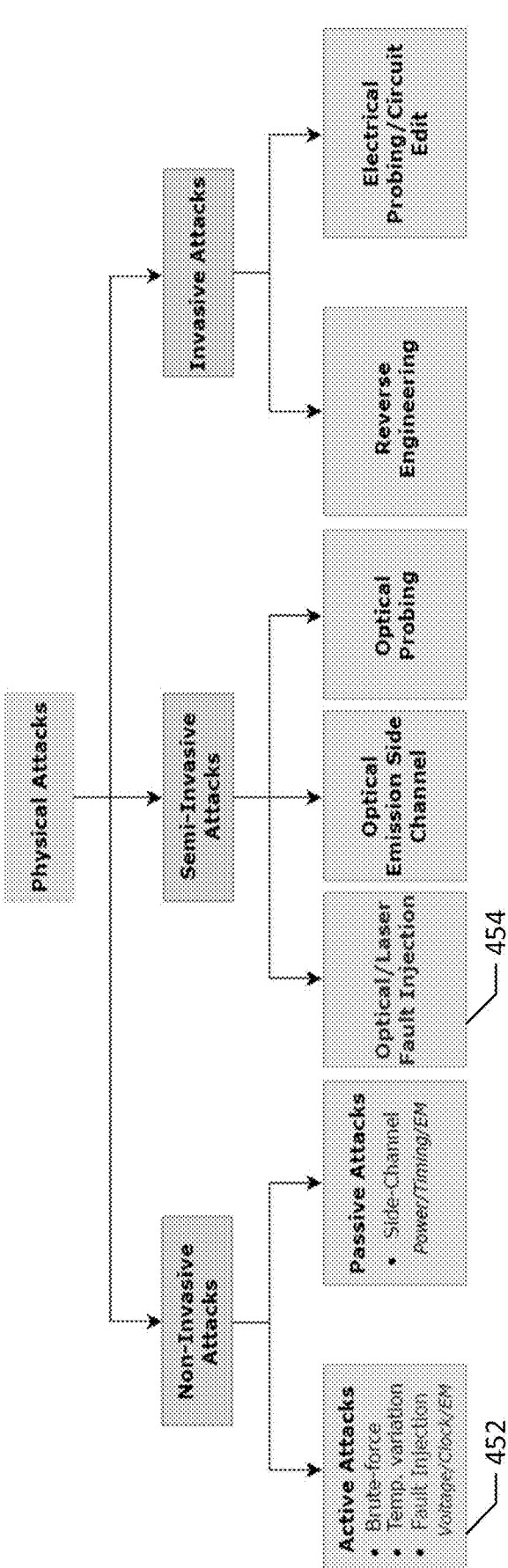
FIG. 4B illustrates other example fault injection attacks, according to one or more embodiments of the present disclosure.

In various embodiments, the FTC sensor 100 and/or the FTC sensor 100' is configured as a universal detection mechanism against fault injection attacks. For example, the FTC sensor 100 and/or the FTC sensor 100' can be configured to detect and/or mitigate a voltage glitch fault injection attack 402, a clock glitch fault injection attack 404, an EM fault injection attack 406, and an optical/laser fault injection attack 408, as illustrated in FIG. 4A. In another example, the FTC sensor 100 and/or the FTC sensor 100' can be configured to detect and/or mitigate an active attack 452 associated with a fault injection attack (e.g., a voltage glitch fault injection attack, a clock glitch fault injection attack, and/or an EM fault injection attack). In yet example, the FTC sensor 100 and/or the FTC sensor 100' can be configured to detect and/or mitigate a semi-invasive attack 454 associated with a fault injection attack (e.g., an optical/laser fault injection attack). In various embodiments, the FTC sensor 100 and/or the FTC sensor 100' can be configured with a universal sensor design capable of detecting and/or mitigating prominent fault injection attacks such as the voltage glitch fault injection attack 402, the clock glitch fault injection attack 404, the EM fault injection attack 406, the optical/laser fault injection attack 408, the active attack 452, and/or the semi-invasive attack 454 by converting different fault effects into "time." Accordingly, the FTC sensor 100 and/or the FTC sensor 100' can detect and/or mitigate several types of fault injection attacks with high accuracy and effectiveness.

In various embodiments, the FTC sensor 100 and/or the FTC sensor 100' can utilize security properties (SP)-driven vulnerability assessment of integrated circuits against fault injection attacks. Additionally, the FTC sensor 100 and/or the FTC sensor 100' can detect and/or mitigate fault injection attacks based on a design-under-test framework. For example, sensor outputs can be combined and compared against a golden dataset using comparator-based logic to detect faults at runtime. A design-under-test can correspond to an integrated circuit. In various embodiments, normal operations of an integrated circuit can be halted or reset in response to detection of a fault injection attack via the FTC sensor 100 and/or the FTC sensor 100' to prevent the fault injection attack from negatively affecting the integrated circuit.

In this regard, a security asset in a chip is a value that is worth protecting against different adversaries. It can be either tangible or intangible, such as passwords or one's fingerprint that defines the accessibility to a mobile phone. For integrated circuits, the asset could be encryption keys, obfuscation keys, device configurations, manufacture's firmware, communication credentials, etc. These assets should be properly protected against various attacks to avoid any secret leakage, illegal authentication, loss of profit, or reputation decline. Therefore, corresponding security properties specifying the secure utilization of the design are needed as a guidance to protect these assets and improve the scalability of the present security framework. Further, by tampering security-critical locations using fault-injection techniques, the attacker can violate the security properties and achieve privileges to leak/tamper asset information. Hence, the capability to violate one of the security properties can be utilized as the criteria to identify the critical locations. If the injected faults cannot violate any of the security properties, the underlying threat is much less of a concern compared to the faults that can violate properties. This can help with efficiently prioritizing the critical faults and locations, and to develop effective and resource-constrained local countermeasures.

As an input to the present framework, the appropriate definition and selection of security properties dictates the quality of the assessment because not all security properties are suitable for fault-injection vulnerability assessment. Therefore, a preference for identifying a security property subset herein is that the security property should be related to or can be violated by one of the fault-injection attacks. In various embodiments, security properties that are at the gate level of the integrated circuit design (e.g., instead of a layout level) may be preferably selected.

In addition, most of the conventionally known security properties are described at a high level (often using natural language) without detailed metrics. It may not be clear how to check if the security property is violated in the target level of abstraction of the design. Therefore, another preference for the security property herein is that the security property should be converted to one or more executable properties with explicit verification metrics. For example, the security property, "AES internal rounds cannot be skipped and directly jumped to the final round", can be converted to an executable one as described below.

In various embodiments, signal property 1 (SP1) can refer to the done signal that indicates the completion of ten AES rounds cannot be raised in the $1^{st}$ round. In this case, the time (e.g., the $1^{st}$ AES round) and the location (e.g., the done signal) to check the security property violation are clear, which is more executable than the original one. Thus, in various embodiments, the security property-driven vulnerability assessment framework may comprise prompting a user to define a specific time and a specific location for a security property, receiving an indication of a specific time and/or a specific location (e.g., via user input), identifying a specific time and/or a specific location for a security property described in natural language using a natural language processing machine learning model, and/or the like.

Figure 5A:
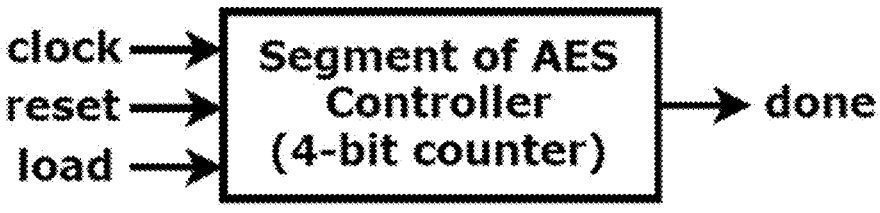
FIG. 5A illustrates an example fan-in circuit, according to one or more embodiments of the present disclosure.
Figure 5B:
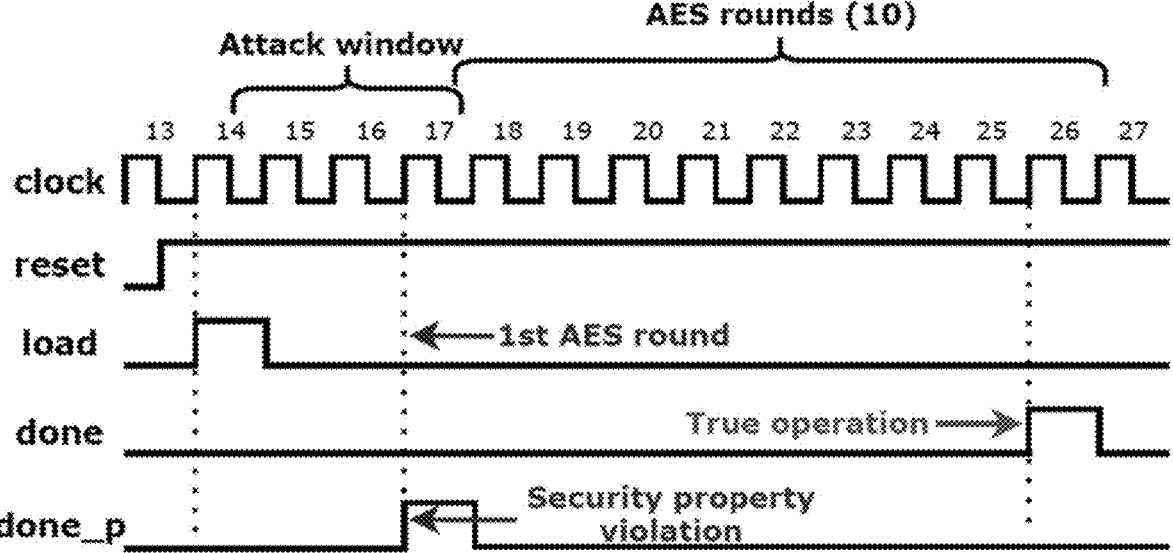
FIG. 5B illustrates an example signal property 1 (SP1) waveform, according to one or more embodiments of the present disclosure.

If SP1 is violated, the $1^{st}$ round AES results would be leaked at the primary output in which the encryption strength provided by the AES algorithm would be significantly reduced. FIG. 5A shows the extracted fan-in circuit of the done signal which is a 4-bit counter. FIG. 5B illustrates example waveforms for monitoring SP1. The done waveform is the correct waveform in the normal operation, while the done_p waveform is the faulty waveform with the security property violated. That is, the done_p waveform demonstrates the violation of SP1 with the completion of ten AES rounds being indicated in the first AES round. In some embodiments, the done_p waveform can correspond to a security property violation (e.g., detection of a fault injection attack). When the load signal is raised at clock cycle 24, the keys and plaintext are loaded in the design and the AES encryption operation starts. It takes two clock cycles (25 and 26) to initialize the key expansion, and the $1^{st}$ AES round starts from the next cycle (cycle 27). In the normal operation, it takes ten rounds to encrypt the plaintext, so the done signal will be raised nine clock cycles after the $1^{st}$ round (cycle 36) as shown in FIG. 5B. However, when faults are injected in the security property fan-in circuit as shown in FIG. 5A and the done signal is raised three clock cycles after the AES keys are loaded (cycle 27), SP1 would be violated and the strength of the encryption algorithm will be compromised, in the example shown in FIG. 5B. Thus, explicit definition of security properties, such as via a specific time and a specific location as demonstrated in FIGS. 5A-B, enables efficient identification of faults that violate security properties.

There are many techniques to inject faults in a system, such as clock/voltage glitching, EM, laser beam, or optical as discussed herein. The mechanism of fault generation from these techniques are fundamentally different. Hence, the format and impact of the faults injected by these techniques also differ significantly. For example, the faults injected by clock glitching may be global and random, while the faults injected by laser may be local and deterministic. Therefore, a comprehensive modeling of the existing fault-injection techniques is necessary to enable fast, reliable, and accurate assessment of the fault-injection vulnerability. Without such models, it is difficult to evaluate how these faults injected by different techniques would impact the circuit and security properties.

A fault model is a set of attributes characterized from the physical impact of the faults injected by a specific technique. It converts a physical event of fault-injection into a logical model. Using the logical model, the fault-injection and propagation in the digital circuit can be simulated and the impact of the faults can be analyzed for different fault-injection techniques. Different fault-injection techniques differ greatly in their ability to control the location and time (spatial and temporal) of the injected faults, in the number of bits affected, and the like. The list below shows fundamental attributes for fault model characterization herein.

In various embodiments, with a fault category, faults can be classified into two major categories: (i) global faults where they are injected globally across the whole design, such as clock faults or voltage faults, and (ii) local faults where they are injected locally in a small portion of the design, such as laser or FIB.

In various embodiments, with a fault-injection location, complete control spatially means a single specific cell in a design can be affected, e.g., using a high-resolution laser. Some control means a specific group of cells or a region can be targeted, but the sub-location within the specific group or region is unknown, e.g., faults can only be injected in sequential cells using the clock-based fault-injection technique. No control represents the faults that would be injected randomly among all cells in the design.

In various embodiments, with a fault-injection time, complete control temporally indicates that the faults can be fully synchronized with the design or operation and can be injected at a specific point of time. Some control means a set of operations or clock cycles can be targeted, but not a specific one. No control represents faults that can only be injected at a random time.

In various embodiments, with a fault type, faults can have different effects on the chip: stuck-at fault, bit-flip fault, set/reset fault, destructive fault (permanent damage), and the like.

In various embodiments, with a fault duration, faults can have different duration: transient and permanent.

These attributes or aspects of faults are further described in Table 1, which describes examples possible values for each fault attribute or aspect. However, it will be understood that, in various example embodiments, faults may be modelled according to various other attributes and/or with the described attributes having different possible values. That is, Table 1 provides example and non-limiting values for different fault attributes.

TABLE 1

Modeling Faults with Fault Attributes

| Fault Attribute | Possible Values |
|---|---|
| Location | {no control, some control, complete control} |
| Timing | {no control, some control, complete control} |
| Number of bits | {single-bit, byte-size, word-size, variable-size} |
| Fault type | {stuck-at, bit flip, set/reset, random} |
| Duration | {transient, permanent, destructive} |

In addition, the specification (e.g., high or low resolution) of the fault-injection technique and the targeted technology node of the design could also impact the fault model. For example, a high-resolution laser can inject faults at any cells in a design with large feature size (complete control on fault location). However, a low-resolution laser may impact tens/hundreds of cells at a time in a design with small feature size (some control on fault location).

Table 2 shows the characterized fault model for different fault-injection techniques. Clock glitching, voltage glitching, and EM are classified as global fault-injection techniques, while laser and FIB are classified as local fault-injection techniques. Generally, local fault-injection techniques are more controllable in fault location and time. For fault type and duration, all fault-injection techniques evaluated in Table 2 can be modeled as bit-flip and transient, respectively.

TABLE 2

Fault model characterization

| | | Spatial Control | | | Temporal Control | | | Fault | Fault |
|---|---|---|---|---|---|---|---|---|---|
| Technique | Fault Category | No | Some | Compl. | No | Some | Compl. | Type | Duration |
| Clock Glitching | Global | ✓ | ✓ | | | ✓ | ✓ | Bit-flip | Transient |
| Voltage Glitching | Global | ✓ | ✓ | | ✓ | ✓ | ✓ | Bit-flip | Transient |
| EM | Global | ✓ | ✓ | | ✓ | ✓ | ✓ | Bit-flip | Transient |
| Laser | Local | | ✓ | ✓ | | ✓ | ✓ | Bit-flip | Transient |
| FIB | Local | | | ✓ | | ✓ | ✓ | Bit-flip Stuck-at | Transient Permanent |

To implement the fault simulation, a detailed fault list must be generated with the exact time, location, type, and duration. The fault list is generated based on each security property and fault model. For most fault-injection techniques, the fault type can be modeled as bit-flip and the fault duration can be modeled as transient for one clock cycle, as shown in Table 2.

For the fault-injection time, the strongest attacker is assumed who has complete control on the clock cycle at which the fault would be injected (in practical scenarios, this assumption may not always hold true; therefore, the attack success is actually lower). The attack window would start with raising a control signal, like start, load, and the like, that launches a new round of operation in the design. The attack window would close when the security property is checked. Taking the SP1 mentioned herein as an example, the attack window opens when the load signal is raised (clock cycle: 24) to start the AES and the attack window is closed in the first AES round (clock cycle: 27) at which the security property is checked, as shown in FIG. 5B. Therefore, if only one-time attack is considered in which the faults are injected only once, the fault-injection time falls in any one of the clock cycles from 24 to 27 for SP1. So, the fault-injection time ($T_f$) is 4, meaning there are opportunities in four clock cycles to inject fault.

For the fault-injection techniques that result in global faults, such as clock glitching or voltage glitching, in order to reduce the simulation workload, the potential fault-injection locations can be modeled only at sequential cells because only the latched faults at sequential cells are impacted, and their contents are propagated in the design. This is similar to single event upset (SEU) faults, but multiple events are also considered herein. For the fault-injection techniques that result in local faults, such as FIB or laser, the potential fault-injection locations can be any cells (sequential and combinational cells) in the design, which is similar to the union of single event upset faults and single event transient faults (SEU+SET), but multiple fault locations are also considered herein.

Practically, the actual concurrent fault locations in an attack can be any combination of cells in the potential injection locations. However, if the design size is large, it is not necessary to simulate all possible combinations of fault locations because the possibility of implementing a specific fault combination decreases exponentially with the increase in concurrent fault locations. For example, the possibility of injecting a fault at only one specific cell among 1000 cells might be $$1 \times 10^{-3}, \text{ or } \left(1 / \binom{1000}{1}\right).$$

However, the possibility to inject concurrent faults at 20 specific cells among 1000 cells is $$3 \times 10^{-42}, \text{ or } \left(1 / \binom{1000}{20}\right),$$

which is exponentially lower than the possibility to guess the key value of a 128-AES module at once ($\frac{1}{2}^{128}=3\times10^{-39}$). Further, for some fault-injection techniques, like laser, the number of concurrent fault locations is also limited by the number of laser beams (typically, it is only one). Therefore, a small threshold can be set for the number of concurrent fault locations considered in the fault simulation. This threshold can vary depending on the fault-injection technique's specification, simulation capability, and the benchmark size. In some example embodiments, this threshold can be set to 1 or 2.

For SP1, first, the fan-in circuit of this security property (the fan-in circuit of the done signal) is extracted as shown in FIG. 5A. The RTL of the AES module is from OpenCores and the gate level netlist is synthesized using Synopsys Design Compiler with SAED32 nm library. Table 3 shows the general information of the extracted fan-in circuit. It is a small circuit, part of AES control logic. There are only three primary inputs associated with SP1: clock, load (key load), and reset. The only output is the done signal which is the checkpoint of the security property. By checking when the done signal is raised, one would know whether the security property is violated.

TABLE 3

| Fan-in circuit information of SP1 | | | | | |
|---|---|---|---|---|---|
| Input | Outputs | Nets | Sequential Cells ($N_s$) | Combinational Cells ($N_c$) | Total Cells ($N_t$) |
| 3 | 1 | 36 | 5 | 26 | 31 |

For a global fault-injection technique assessment, the potential fault-injection locations are modeled only at the output of sequential cells to minimize the fault simulation workload. As shown in Table 3, the number of sequential cells ($N_S$) in this circuit is 5. Since it is a small number of sequential cells, all possible combinations of these 5 locations are considered as fault-injection locations in the fault list. Thus, the concurrent fault threshold ($CF_{th}$) is set to 5. If the potential fault-injection locations are large, only one or two concurrent fault locations are considered, as discussed earlier. Hence, the total number of faults for global fault-injection technique assessment ($TF_g$) in the fault list is:

$$TF_g = T_f \times \sum_{i=1}^{CF_{th}} \binom{N_s}{i} = 4 \times \left[ \binom{5}{1} + \binom{5}{2} + \binom{5}{3} + \binom{5}{4} + \binom{5}{5} \right] = 124$$

where $T_f$ represents the number of fault-injection time. For the local fault-injection technique assessment, the potential fault-injection locations are the output of all cells in the circuit. As shown in Table 3, the number of total cells ($N_T$) is 31 in total. As illustrated before, it is not necessary to consider all possible combinations of the potential fault-injection locations. Here, up to 4 concurrent fault locations ($CF_{th}$=4) are considered in this fault list and the total number of faults for local fault-injection technique assessment ($TF_l$) is:

$$TF_g = T_f \times \sum_{i=1}^{CF_{th}} \binom{N_T}{i} = 4 \times \left[ \binom{31}{1} + \binom{31}{2} + \binom{31}{3} + \binom{31}{4} \right] = 145,824.$$

In the present framework, the fault simulation may be performed using a fast and comprehensive functional fault simulator. By injecting faults in the design, the attacker can achieve privileges to leak/tamper asset information. Hence, the critical locations of the design to fault-injection attacks should be identified to avoid security property violation. Protection of these critical locations with high priority ensures that the assets cannot be leaked/tampered and the security properties cannot be violated by fault-injection attacks.

In a fault-injection attack, the faults might be injected directly at locations where a property is checked (e.g., done signal in SP1) or in their fan-in circuit (e.g., FIG. 5A), if it is easier. Therefore, during fault simulation, faults may be injected at both locations based on the fault model characterized from the targeted fault-injection technique and the corresponding fault list, considering the security property, as illustrated herein. If the injected faults violate the security property, the fault simulation would capture this violation and mark the corresponding faults. The critical locations can be extracted from those faults. These critical locations should be properly protected using countermeasures against fault-injection attacks.

Different security properties may involve different portions of the design, which means the property can only be violated if the faults are injected in the specific portion of the design. In most cases, this portion would be the fan-in circuit of the location referred in the security property. For example, in the case of SP1, the security property can be violated only if the faults are injected in the fan-in circuit of the done signal. Therefore, to increase the efficiency of fault simulation, the fan-in circuit of the security property would be extracted, and the fault simulation would be performed on the extracted circuit only.

Besides the fault and the design implementation, violation of a security property also depends on the stimulus vector. With the same fault in a design, some stimulus can successfully violate the security property, but some others cannot because the toggling activities of internal signals vary from different stimulus. Therefore, by feeding different stimulus to the simulation with the same fault, the rate of the security property violation for the targeted fault can be calculated. Faults with zero security property violation rate can be defined as non-effective faults. Faults with non-zero security property violation rate can be defined as effective faults. Table 4 summarizes the terms used in the present disclosure and their definitions.

TABLE 4

| Terminologies used in the paper and their definitions | |
|---|---|
| Terms | Definitions |
| Non-effective faults | Faults with approximately zero security property violation rate (e.g., less than 0.1%, less than 0.5%, less than 1%) |
| Effective faults | Faults with approximately non-zero security property violation rate (e.g., greater than 0.1%, greater than 0.5%, greater than 1%) |
| Critical faults | Effective faults for which all associated fault locations are necessary for security property violation |
| Feasible faults | Critical faults that can be implemented by a setup-time based fault-injection technique |
| Critical locations | A set of locations within an IC design (e.g., a gate of an IC design) that has overlap with every critical or feasible fault and the set size is minimized |

If the extracted fan-in circuit of the security property is a part of the control logic (e.g., FSM), specific input patterns that are commonly used for the functionality of the control logic can be utilized as the stimulus in the fault simulation. For example, in SP1, since one input is the clock and the other two inputs are control signals, these signals are switching with a fixed pattern instead of random transitions. Therefore, only one specific pattern is applied as the input stimulus to the extracted fan-in circuit of SP1, as shown in FIG. 5B. If the extracted circuit is part of an arithmetical logic (e.g., arithmetic-logic unit (ALU)), random input vectors (e.g., including numerical values) could be used as the stimulus.

In various embodiments, once the security property, fault list, stimulus, and the security property fan-in circuit are available, the fault simulation can be performed. In various embodiments, any of the security properties, the fault list, stimuli, and security property fan-in circuits can be defined explicitly by a user (e.g., via user input) or automatically.

Figure 6:
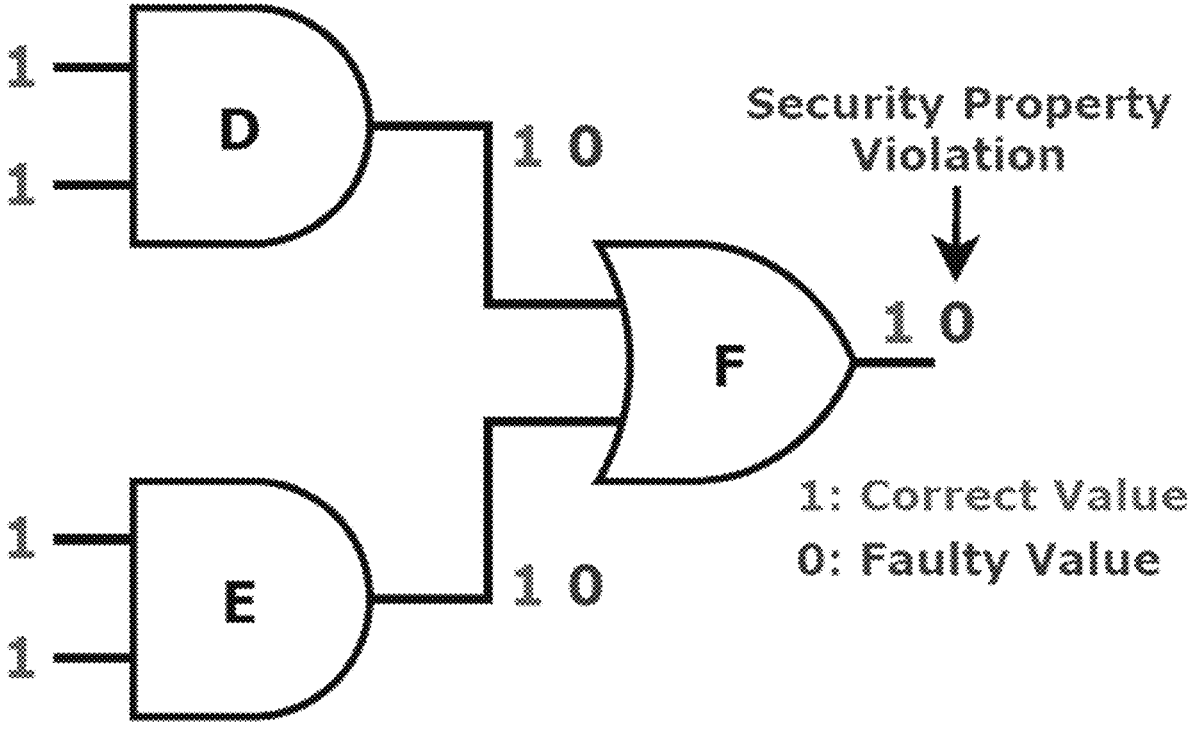
FIG. 6 illustrates an example identification of critical faults, according to one or more embodiments of the present disclosure.

When the fault simulation is done, it can be determined whether a fault in the fault list is effective at violating the target security property, and in various embodiments, the security property-driven vulnerability assessment framework involves iterating through the fault list to determine effectiveness of each fault (e.g., a SP violation rate for each fault). One fault can be associated with one or more fault locations. As an example shown in FIG. 6, its fault list is shown in Table 5. As observable, faults #1-3 only have one fault location, while faults #4-6 have two fault locations, and fault #7 has three fault locations. If an effective fault consists of two or more fault locations, not every fault location is necessarily contributing to the security property violation. In other words, injecting faults at a subset of the fault locations of an effective fault may still violate the security property. Therefore, faults with all fault locations contributing to the security property violation are defined as critical faults. For the example shown in FIG. 6, the following security property is considered: the output of cell C should not be 0.

In the illustrated embodiments, it is assumed (from demonstration) that faults can be injected at any combination of the output of cells A, B, and C. Table 5 shows the fault list and the identified critical faults in this case. Three possible fault locations (cell output: A, B, and C) result in 7 different faults considering all combinations of the three fault locations $$\left( \sum_{i=1}^{3} \binom{3}{i} \right).$$

Except for faults #1 and #2, all other faults can effectively violate the security property. However, one can see that some fault locations are not critical to the property violation. For example, a single location fault at cell C (fault #3) alone can violate the security property. It is the critical contributor to the violation, so this fault is identified as a critical fault. Any other fault that contains the fault location at cell C (e.g., fault #5-#7) can violate the security property because of the existence of the fault at cell C, instead of the faults at other fault locations. They are effective faults but not critical faults. Another critical fault identified in this case is the fault at location A+B (fault #4: concurrent fault at A and B). Although there are 5 effective faults in this example, only 2 can be identified as critical faults.

TABLE 5

| | | Fault list and critical faults | |
|---|---|---|---|
| Fault Index (#) | Location (Cell output) | Effective Fault | Critical Fault |
| 1 | A | No | No |
| 2 | B | No | No |
| 3 | C | Yes | Yes |
| 4 | A + B | Yes | Yes |
| 5 | A + C | Yes | No |
| 6 | B + C | Yes | No |
| 7 | A + B + C | Yes | No |

Taking into consideration that every location in a critical fault is vital to the violation of the security property, if the fault cannot be injected at one of the locations in a critical fault (e.g., location A of fault #4 in Table 5), the corresponding security property will never be compromised by the attacker. Therefore, for all critical faults, if at least one fault location is properly protected, all critical faults cannot be implemented. Hence, the critical location is defined as a set of locations that covers all critical faults and the set size is minimized.

Table 6 shows one example of critical locations identified from critical faults in a different example IC design. In this example, there are 4 critical faults with different fault locations that every fault location is contributing to the security property violation. Without the critical location identification, all 7 fault locations (H-N) would have to be protected against fault-injection attacks. However, location H can be identified as critical location with the set size being only one, as location H is common to all critical faults. Therefore, by only protecting this one critical location, all the 4 critical faults would never be enabled. Another location set {I, J, K, M} covers all critical faults as well. However, the set size is 4, which is not the minimal size. Hence, this location set is not the critical location. Through minimization of critical location set size, countermeasures can be efficiently deployed with maximum protection or coverage.

TABLE 6

| | Example critical location identification | |
|---|---|---|
| Critical Fault Index (#) | Location (Cell Output) | Critical Location |
| 8 | H + I | H |
| 9 | H + J | |
| 10 | H + K + L | |
| 11 | H + M + N | |

Figure 7:
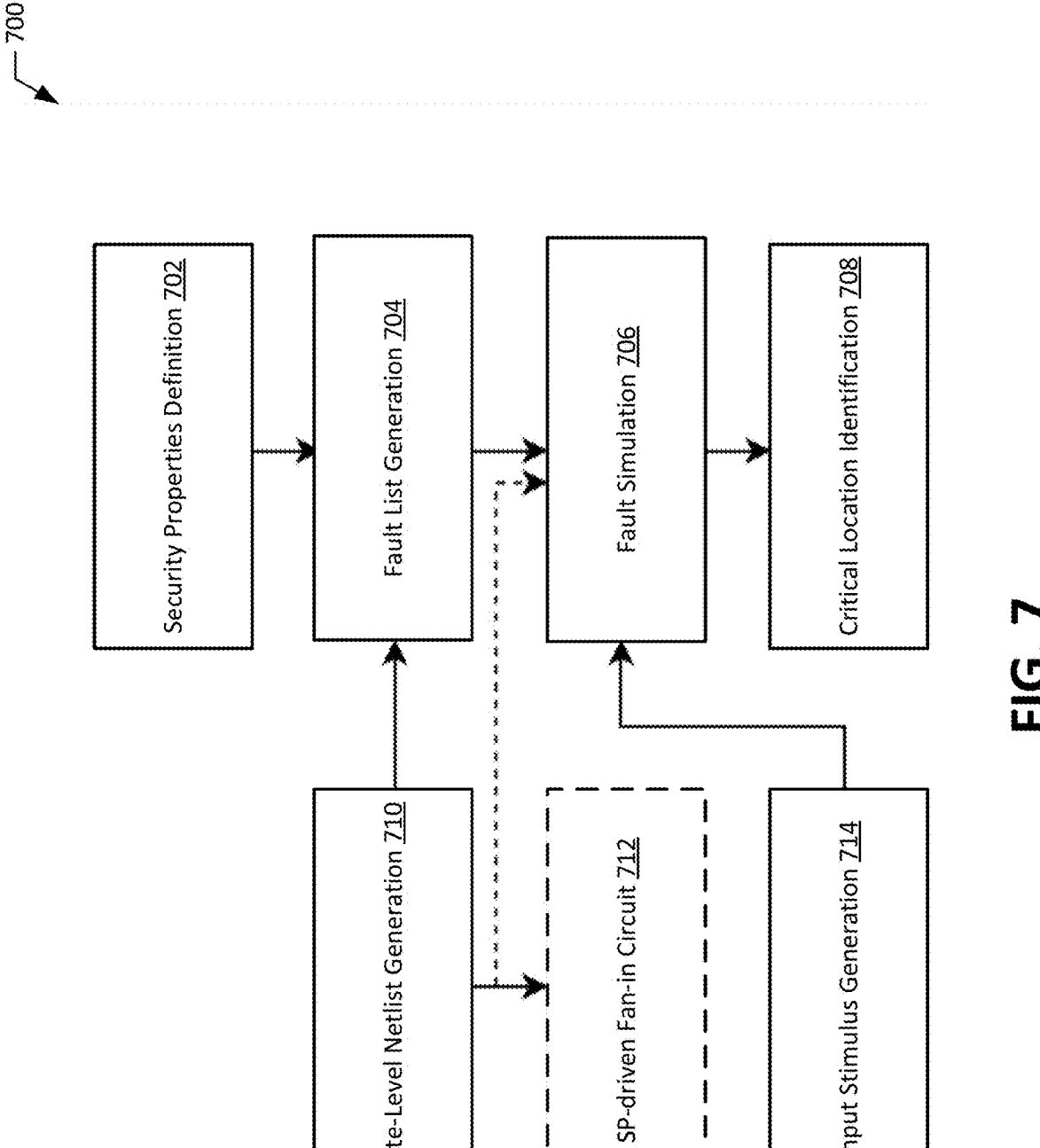
FIG. 7 illustrates an example data flow for providing critical location extraction, according to one or more embodiments of the present disclosure.

FIG. 7 illustrates a data flow 700 for providing critical location extraction, according to one or more embodiments of the present disclosure. For example, the data flow 700 can provide steps for providing fault model characterization, fault list generation based on fault model and security properties, and/or fault simulation to identify critical locations. In various embodiments, the data flow 700 includes security properties definition 702, fault list generation 704, and/or fault simulation 706 that are utilized to provide a critical location identification 708. In various embodiments, the fault list generation 704 can be provided based on gate-level netlist generation 710. In various embodiments, the fault simulation 706 can be provided based on the gate-level netlist generation 710 and/or an SP-driven fan-in circuit 712 extracted from the gate-level netlist. In various embodiments, the fault simulation 706 can be additionally or alternatively provided based on input stimulus generation 714.

Figure 8:
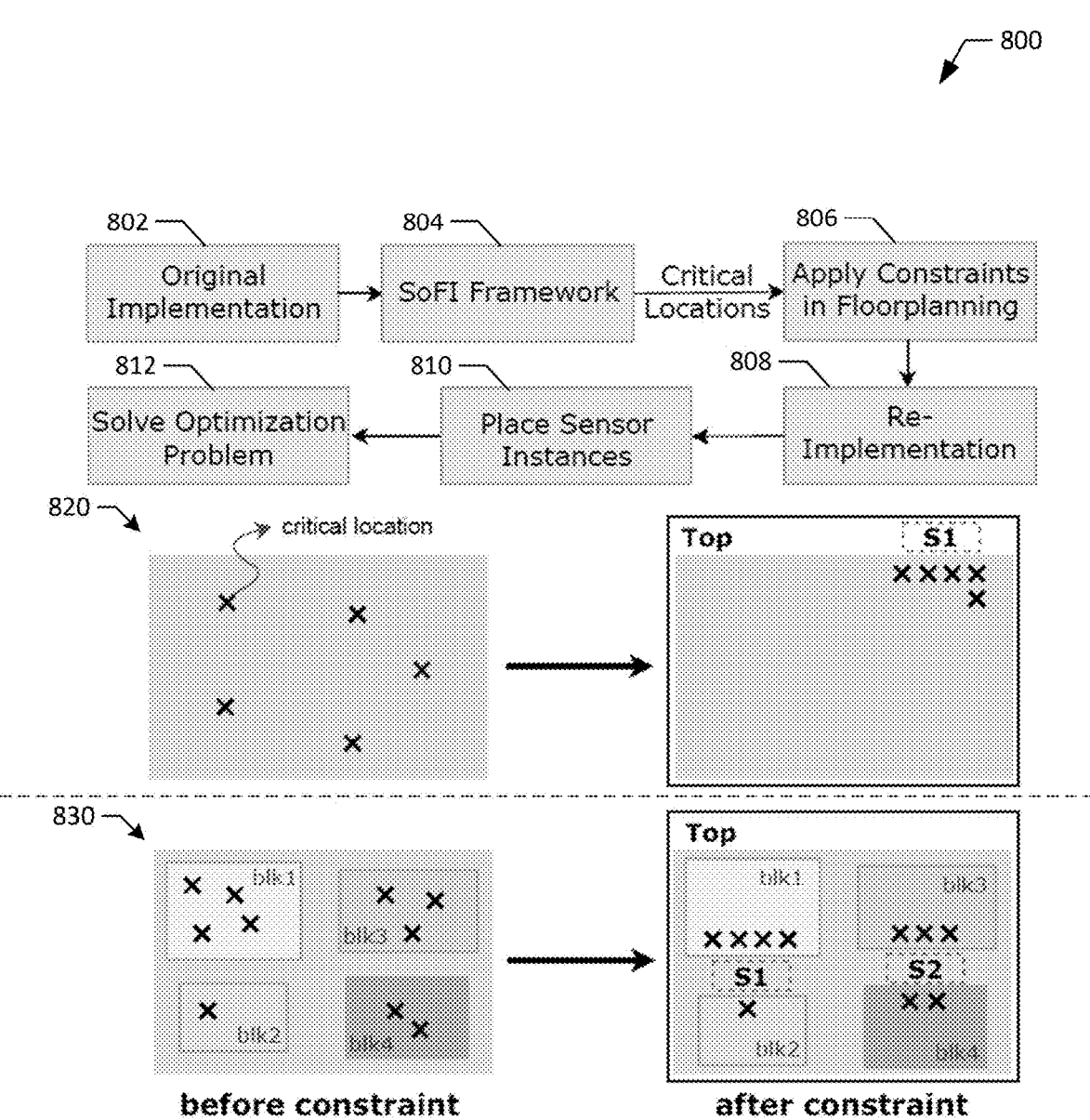
FIG. 8 illustrates an example data flow for applying constraints on identified critical locations, according to one or more embodiments of the present disclosure.

FIG. 8 illustrates a data flow 800 for applying constraints on identified critical locations, according to one or more embodiments of the present disclosure. In various embodiments, an original design can be implemented with a nominal configuration based on a set of design specifications at step 802. Additionally, a security property-driven vulnerability assessment framework (SoFI) can be executed at step 804 to identify critical locations. By locating the fault-vulnerable elements (e.g., the critical locations) in the design, constraints can be applied during a floorplanning stage at step 806 to place the identified cells near the edge of the design modules. For example, the constraints can be based on the critical locations. In various embodiments, re-implementation of the original implementation can be performed at step 808. Additionally, sensor instances can be placed at step 810 and/or an optimization problem can be solved at 812. For example, the FTC sensor 100 and/or the FTC sensor 100' can be optimally placed on an integrated circuit at step 810 to facilitate fault injection attack detection and/or mitigation. With the data flow 800, two scenarios can be considered. For example, a scenario 820 can be associated with a design level and a scenario 830 can be associated with a circuit level. In both scenarios, the constraints can be applied to facilitate optimal placement of sensors and/or placement of the sensors nearby fault-vulnerable cells. In a single module, the data flow 800 can be applied to the design level (e.g., AES core), whereas one or more modules can apply the data flow 800 at the circuit level. Accordingly, an efficient output from an optimization tool can be provided, resulting in fewer sensor instances ("S1" for scenario 820 and "S1, S2" for scenario 830 in FIG. 8) placed optimally near vulnerable locations with respect to an integrated circuit.

FIG. 9 illustrates a graph 900 related to sensor outputs for detecting a fault injection attack, according to one or more embodiments of the present disclosure. For example, the graph 900 can be related to sensor outputs for detecting an EMFI attack using the FTC sensor 100 and/or the FTC sensor 100'. The solid lines define the traversal of XORed '1' bit values (e.g., from the HVT cells 102 and the LVT cells 104) ranging from observable buffer elements 45-46 to 77-78 under nominal conditions. As the injected electrical pulse (e.g., the injected EM pulse) is sinusoidal with a varying frequency, the impact of the pulse in the delay line is likely to be both a voltage overshoot and undershoot. The dotted line in the graph 900 can be explained using this phenomenon. In certain embodiments, the HVT cells 102 can be impacted more than the LVT cells 104 by introducing XORed '1' bi values in the initial bits of the delay line (e.g., impacted HVT cells consisting of '0' bit values and not so impacted LVT cells consisting of '1' bit values). This impact can be seen as the decrease in the lower limit of the dotted line 902 of the graph 900. However, the other dotted line 904 of the graph 900 shows an increase from the solid line 906, which indicates the furthest buffers close to the most significant bit have received '1' bit values, which is the effect of a voltage overshoot. The dashed area shows the new range for XORed '1' bit values introduced under a fault injection attack such as an EMFI. The deviated output for an EMFI scenario can arise from an alternating nature of the generated EM.

Figure 10:
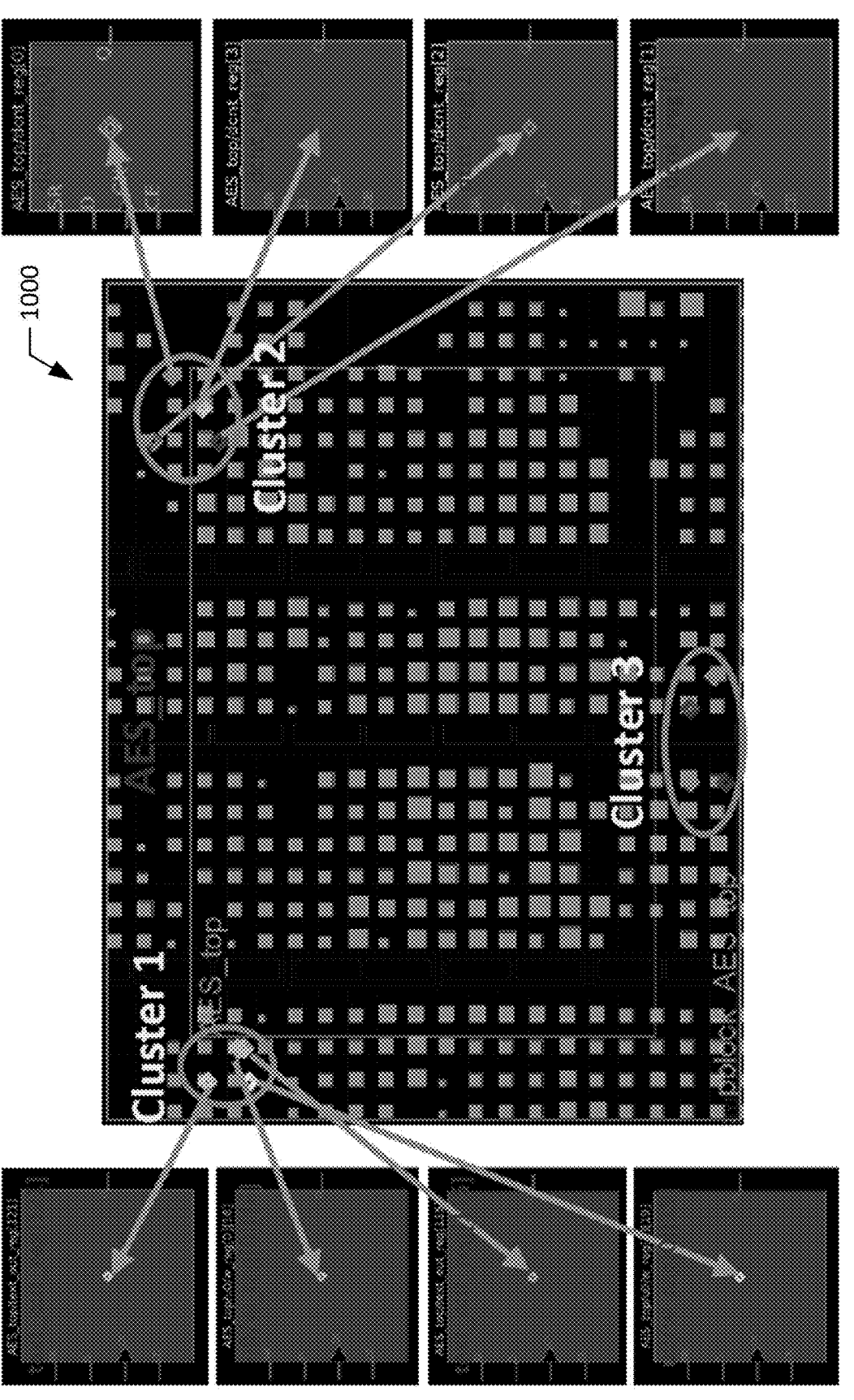
FIG. 10 illustrates an example integrated circuit associated with identified security critical locations, according to one or more embodiments of the present disclosure.

FIG. 10 illustrates an integrated circuit 1000 associated with identified security critical locations, according to one or more embodiments of the present disclosure. For example, the integrated circuit 1000 can be an integrated circuit with one or more fault injection attacks detected via the FTC sensor 100 and/or the FTC sensor 100'. In various embodiments, the integrated circuit 1000 can be a design-under-test. In various embodiments, the integrated circuit 1000 can be an AES encryption design for an integrated circuit. In FIG. 10, three clusters (e.g., Cluster 1, Cluster 2, and Cluster 3) can be identified with critical locations vulnerable to fault injection attacks. Two clusters (e.g., Cluster 1 and Cluster 2) are depicted in a zoomed view, showing four registers each on both sides of the integrated circuit 1000. Additionally, Cluster 3 can also be identified with critical locations vulnerable to fault injection attacks.

Figure 11:
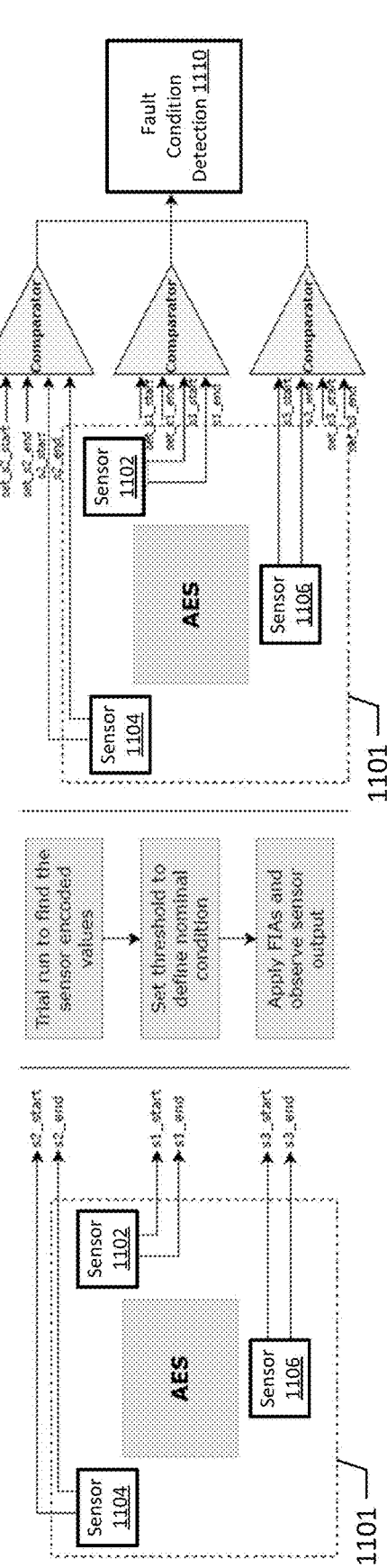
FIG. 11 illustrates an example system associated with fault injection attack detection, according to one or more embodiments of the present disclosure.

FIG. 11 illustrates a system 1100 associated with fault injection attack detection, according to one or more embodiments of the present disclosure. The system 1100 includes an integrated circuit 1101 associated with AES encryption or another type of encryption. Additionally, the system 1100 includes one or more sensors (e.g., sensor 1102, sensor 1104, and/or sensor 1106) utilized to detect a fault injection attack. In various embodiments, the one or more sensors (e.g., the sensor 1102, the sensor 1104, and/or the sensor 1106) can correspond to the FTC sensor 100 and/or the FTC sensor 100'. In various embodiments, output from the one or more sensors (e.g., the sensor 1102, the sensor 1104, and/or the sensor 1106) can be utilized and/or aggregated to provide a fault condition detection 1110. For example, the fault condition detection 1110 can detect one or more fault injection attacks associated with the integrated circuit 1101.

FIG. 12 illustrates a flowchart of a method 1200 for providing fault injection attack mitigation for an integrated circuit, according to one or more embodiments of the present disclosure. In various embodiments, the method 1200 can be associated with an FTC sensor (e.g., the FTC sensor 100 and/or the FTC sensor 100'). According to the illustrated embodiment, the method 1200 includes a step 1202 for providing a sampling clock signal to both high voltage threshold (HVT) cells and low voltage threshold (LVT) cells of a fault-to-time converter sensor of an integrated circuit. In some embodiments, the HVT cells are configured to monitor transient changes with respect to the sampling clock signal based on respective high voltage thresholds. In some embodiments, the LVT cells are configured to monitor transient changes with respect to the sampling clock signal based on respective low voltage thresholds. Additionally, the method 1200 includes a step 1204 for providing output of the HVT cells and the LVT cells to an encoder stage of the fault-to-time converter sensor. Additionally, the method 1200 includes a step 1206 for detecting one or more fault injection attacks with respect to the integrated circuit based on output of the encoder stage. In certain embodiments, detecting the one or more fault injection attacks with respect to the integrated circuit includes filtering one or more unexpected XOR output values from the output of the HVT cells and the LVT cells. In certain embodiments, detecting the one or more fault injection attacks with respect to the integrated circuit additionally or alternatively includes identifying a particular sequence of expected XOR output values from the output of the HVT cells and the LVT cells.

In certain embodiments, the method 1200 additionally or alternatively includes storing the output of the HVT cells and the LVT cells via a set of latches. In certain embodiments, the method 1200 additionally or alternatively includes providing the output of the HVT cells and the LVT cells to the encoder stage via the set of latches.

In certain embodiments, the method 1200 additionally or alternatively includes storing a first pattern from a delay line associated with the HVT cells via the set of latches. In certain embodiments, the method 1200 additionally or alternatively includes storing a second pattern from the delay line associated with the LVT cells via the set of latches.

In certain embodiments, the method 1200 additionally or alternatively includes storing the output of the HVT cells and the LVT cells as cached data via a set of latches. In certain embodiments, the method 1200 additionally or alternatively includes providing the cached data to the encoder stage via a set of flip-flops.

In an example embodiment, an apparatus for performing the method 1200 of FIG. 12 above may include a processor configured to perform some or each of the steps (1202, 1204, and/or 1206) described above. The processor may, for example, be configured to perform the steps (1202, 1204, and/or 1206) by performing hardware implemented logical functions, executing stored instructions, or executing algorithms for performing each of the operations. Alternatively, the apparatus may comprise means for performing each of the operations described above. In this regard, according to an example embodiment, examples of means for performing steps 1202, 1204, and/or 1206 may comprise, for example, the processor and/or a device or circuit for executing instructions, executing operations, or executing an algorithm for processing information as described above.

Figure 13:
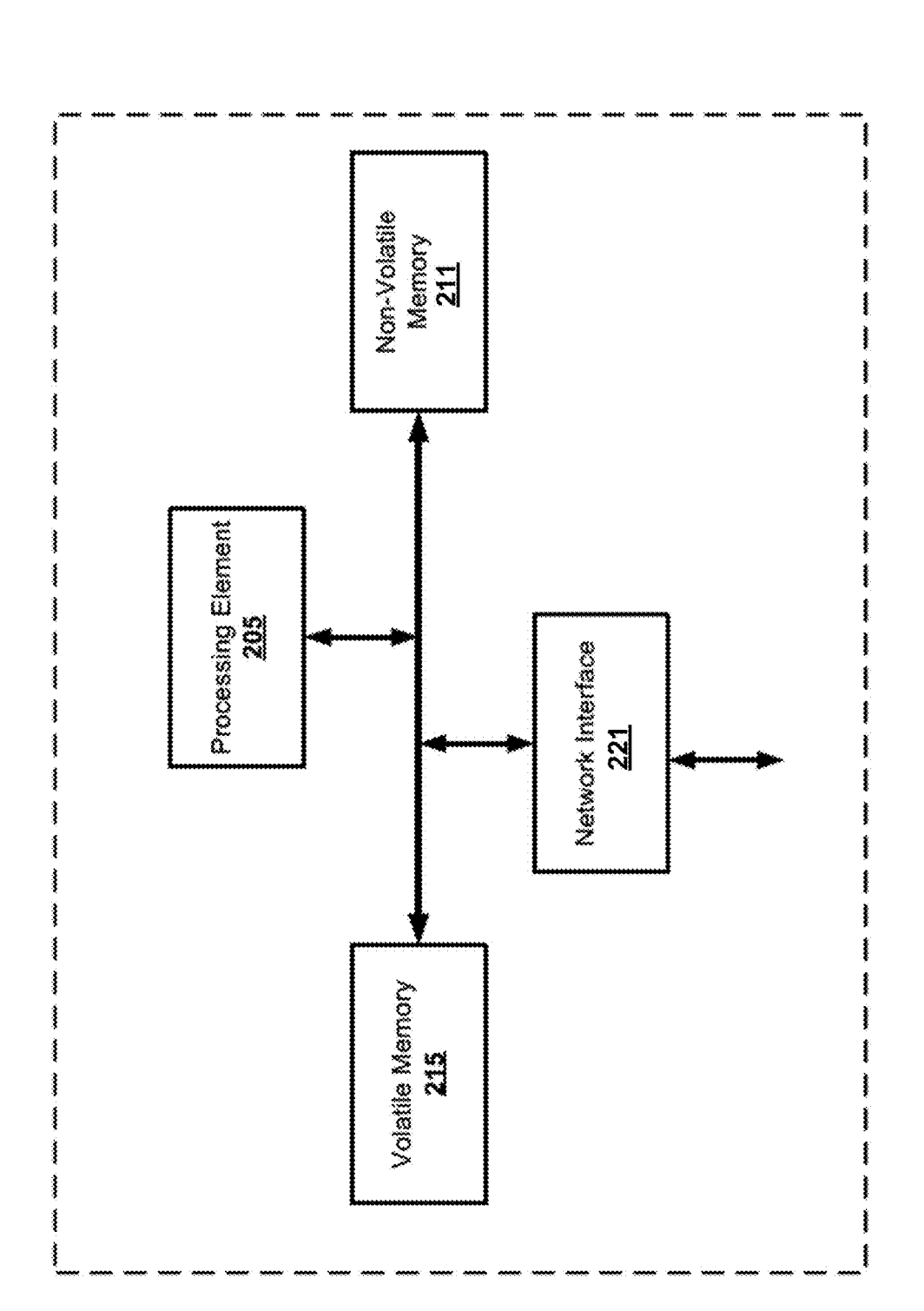
FIG. 13 illustrates a schematic of a computing entity that may be used in conjunction with one or more embodiments of the present disclosure.

In various embodiments, an apparatus for performing the method 1200 may correspond to apparatus 1300 illustrated in FIG. 13

B. Exemplary Technical Implementation of Various Embodiments

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a hardware description language, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

FIG. 13 provides a schematic of an exemplary apparatus 1300 that may be used in accordance with various embodiments of the present disclosure. In particular, the apparatus 1300 may be configured to perform various example operations described herein to provide for electromagnetic based secure contact-less integrity verification of hardware and/or software for integrated circuits. In one or more embodiments, the apparatus 1300 may be embodied by at least a portion of the FTC sensor 100 and/or the FTC sensor 100'. For example, in one or more embodiments, the apparatus 1300 may be embodied by the logic analyzer 124 of the FTC sensor 100'.

In general, the terms computing entity, entity, device, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the field should appreciate that the apparatus 1300 shown in FIG. 13 may be embodied as a plurality of computing entities, tools, and/or the like operating collectively to perform one or more processes, methods, and/or steps. As just one non-limiting example, the apparatus 1300 may comprise a plurality of individual data tools, each of which may perform specified tasks and/or processes.

Depending on the embodiment, the apparatus 1300 may include one or more network and/or communications interfaces 221 for communicating with various computing entities, such as by communicating data, content, information, and/or similar terms used herein interchangeably that can be transmitted, received, operated on, processed, displayed, stored, and/or the like. Thus, in certain embodiments, the apparatus 1300 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANS, WANS, LANS, or PANS. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the apparatus 1300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), 5G New Radio (5G NR), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The apparatus 1300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the apparatus 1300 includes or is in communication with one or more processing elements 205 (also referred to as processors, processing circuitry, and/or similar terms used herein interchangeably) that communicate with other elements within the apparatus 1300 via a bus, for example, or network connection. As will be understood, the processing element 205 may be embodied in several different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, ASICs, FPGAs, programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware, computer program products, or a combination thereof, the processing element 205 may be capable of performing steps or operations according to embodiments of the present disclosure when configured accordingly.

In various embodiments, the apparatus 1300 may include or be in communication with non-volatile media (also referred to as non-volatile storage, memory, memory storage, memory circuitry and/or similar terms used herein interchangeably). For instance, the non-volatile storage or memory may include one or more non-volatile storage or non-volatile memory media 211 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or non-volatile memory media 211 may store files, databases, database instances, database management system entities, images, data, applications, programs, program modules, scripts, source code, object code, byte code, compiled code, inter-preted code, machine code, executable instructions, and/or the like. The term database, database instance, database management system entity, and/or similar terms used herein interchangeably and in a general sense refer to a structured or unstructured collection of information/data that is stored in a computer-readable storage medium.

In particular embodiments, the non-volatile memory media 211 may also be embodied as a data storage device or devices, as a separate database server or servers, or as a combination of data storage devices and separate database servers. Further, in some embodiments, the non-volatile memory media 211 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the apparatus 1300 may further include or be in communication with volatile media (also referred to as volatile storage, memory, memory storage, memory circuitry and/or similar terms used herein inter-changeably). For instance, the volatile storage or memory may also include one or more volatile storage or volatile memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like.

As will be recognized, the volatile storage or volatile memory media 215 may be used to store at least portions of the databases, database instances, database management system entities, data, images, applications, programs, pro-gram modules, scripts, source code, object code, byte code, compiled code, interpreted code, machine code, executable instructions, and/or the like being executed by, for example, the processing element 205. Thus, the databases, database instances, database management system entities, data, images, applications, programs, program modules, scripts, source code, object code, byte code, compiled code, inter-preted code, machine code, executable instructions, and/or the like may be used to control certain aspects of the operation of the apparatus 1300 with the assistance of the processing element 205 and operating system.

As will be appreciated, one or more of the computing entity's components may be located remotely from the other computing entity components, such as in a distributed sys-tem. Furthermore, one or more of the components may be aggregated, and additional components performing func-tions described herein may be included in the apparatus 1300. Thus, the apparatus 1300 can be adapted to accom-modate a variety of needs and circumstances.

C. Conclusion

Many modifications and other embodiments of the inven-tions set forth herein will come to mind to one skilled in the art to which these inventions pertain having the benefit of the teachings presented in the foregoing descriptions and the associated drawings. Therefore, it is to be understood that the inventions are not to be limited to the specific embodi-ments disclosed and that modifications and other embodi-ments are intended to be included within the scope of the appended claims. Although specific terms are employed herein, they are used in a generic and descriptive sense only and not for purposes of limitation.

The invention claimed is:

1. A method for providing fault injection attack mitigation for an integrated circuit, the method comprising:
    providing a sampling clock signal to both high voltage threshold (HVT) cells and low voltage threshold (LVT) cells of a fault-to-time converter sensor of an integrated circuit;
    providing output of the HVT cells and the LVT cells to an encoder stage of the fault-to-time converter sensor;
    storing a first pattern from a delay line associated with the HVT cells via a set of latches;
    storing a second pattern from the delay line associated with the LVT cells via the set of latches; and
    detecting one or more fault injection attacks with respect to the integrated circuit based on output of the encoder stage.

2. The method of claim 1, further comprising:
    storing the output of the HVT cells and the LVT cells via the set of latches; and
    providing the output of the HVT cells and the LVT cells to the encoder stage via the set of latches.

3. The method of claim 1, further comprising:
    storing the output of the HVT cells and the LVT cells as cached data via the set of latches; and
    providing the cached data to the encoder stage via a set of flip-flops.

4. The method of claim 1, wherein detecting the one or more fault injection attacks with respect to the integrated circuit comprises filtering one or more unexpected XOR output values from the output of the HVT cells and the LVT cells.

5. The method of claim 1, wherein detecting the one or more fault injection attacks with respect to the integrated circuit comprises identifying a particular sequence of expected XOR output values from the output of the HVT cells and the LVT cells.

6. The method of claim 1, wherein the HVT cells are configured to monitor transient changes with respect to the sampling clock signal based on respective high voltage thresholds.

7. The method of claim 1, wherein the LVT cells are configured to monitor transient changes with respect to the sampling clock signal based on respective low voltage thresholds.

8. A fault-to-time converter sensor, comprising:

a set of high voltage threshold (HVT) cells configured to receive a sampling clock signal;

a set of low voltage threshold (LVT) cells configured to receive the sampling clock signal;

an encoder device configured to receive output from the set of HVT cells and the set of LVT cells; and a processor configured to detect one or more fault injection attacks based on encoded output of the encoder device, wherein:

a first pattern from a delay line associated with the set of HVT cells is stored via a set of latches, and a second pattern from the delay line associated with the set of LVT cells is stored via the set of latches.

9. The fault-to-time converter sensor of claim 8, wherein the set of HVT cells is configured to monitor transient changes with respect to the sampling clock signal based on respective high voltage thresholds.

10. The fault-to-time converter sensor of claim 8, wherein the set of LVT cells is configured to monitor transient changes with respect to the sampling clock signal based on respective low voltage thresholds.

11. The fault-to-time converter sensor of claim 8, wherein the set of latches is configured to store the output of the set of HVT cells and the set of LVT cells, the output of the set of HVT cells and the set of LVT cells is provided to the encoder device via the set of latches.

12. The fault-to-time converter sensor of claim 8, wherein:

the set of latches is configured to store the output of the set of HVT cells and the set of LVT cells as cached data, and a set of flip-flops is configured to provide the cached data to the encoder device.

13. The fault-to-time converter sensor of claim 8, wherein the encoder device is configured to filter one or more unexpected XOR output values from the output of the set of HVT cells and the set of LVT cells.

14. The fault-to-time converter sensor of claim 8, wherein the encoder device is configured to identify a particular sequence of expected XOR output values from the output of the set of HVT cells and the set of LVT cells.

15. An apparatus comprising at least one processor and at least one memory including program code, the at least one memory and the program code configured to, with the at least one processor, cause the apparatus to at least:

provide a sampling clock signal to both high voltage threshold (HVT) cells and low voltage threshold (LVT) cells of a fault-to-time converter sensor of an integrated circuit;

provide output of the HVT cells and the LVT cells to an encoder stage of the fault-to-time converter sensor;

store a first pattern from a delay line associated with the HVT cells via a set of latches;

store a second pattern from the delay line associated with the LVT cells via the set of latches; and detect one or more fault injection attacks with respect to the integrated circuit based on output of the encoder stage.

16. The apparatus of claim 15, wherein the at least one memory and the program code are configured to, with the at least one processor, further cause the apparatus to at least:

store the output of the HVT cells and the LVT cells via the set of latches; and provide the output of the HVT cells and the LVT cells to the encoder stage via the set of latches.

17. The apparatus of claim 15, wherein the at least one memory and the program code are configured to, with the at least one processor, further cause the apparatus to at least:

store the output of the HVT cells and the LVT cells as cached data via the set of latches; and provide the cached data to the encoder stage via a set of flip-flops.

* * * * *